(12) United States Patent
Varpula et al.

(10) Patent No.: US 10,088,362 B2
(45) Date of Patent: Oct. 2, 2018

(54) MIRROR PLATE FOR AN OPTICAL INTERFEROMETER AND AN OPTICAL INTERFEROMETER

(71) Applicant: Teknologian tutkimuskeskus VTT Oy, Espoo (FI)

(72) Inventors: Aapo Varpula, VTT (FI); Christer Holmlund, VTT (FI); Anna Rissanen, VTT (FI)

(73) Assignee: Teknologian tutkimuskeskus VTT Oy, Espoo (FI)

(*) Notice: Subject to any disclaimer, the term of this patent is extended or adjusted under 35 U.S.C. 154(b) by 0 days.

(21) Appl. No.: 15/540,074

(22) PCT Filed: Dec. 18, 2015

(86) PCT No.: PCT/FI2015/050909
§ 371 (c)(1),
(2) Date: Jun. 27, 2017

(87) PCT Pub. No.: WO2016/107973
PCT Pub. Date: Jul. 7, 2016

(65) Prior Publication Data
US 2017/0350761 A1  Dec. 7, 2017

(30) Foreign Application Priority Data
Dec. 29, 2014  (FI) .................................. 20146151

(51) Int. Cl.
*G01J 3/26* (2006.01)
*G01J 3/02* (2006.01)
*G02B 27/14* (2006.01)

(52) U.S. Cl.
CPC .............. *G01J 3/26* (2013.01); *G01J 3/0286* (2013.01); *G01J 3/0297* (2013.01); *G02B 27/142* (2013.01)

(58) Field of Classification Search
CPC ...... G02B 6/29358; G02B 26/001; G01J 3/26
See application file for complete search history.

(56) References Cited

U.S. PATENT DOCUMENTS 5,550,373 A   8/1996  Cole et al.
5,940,579 A   8/1999  Kallgren et al.
(Continued)

FOREIGN PATENT DOCUMENTS

CN   103733035 A    4/2014
EP   2120082 A1    11/2009
(Continued)

OTHER PUBLICATIONS

Extended European Search Report received for European Patent Application No. EP15875303.8, dated Dec. 12, 2017, 8 pages.
(Continued)

*Primary Examiner* — Kimberly N Kakalec
(74) *Attorney, Agent, or Firm* — Ziegler IP Law Group, LLC

(57) ABSTRACT

A mirror plate (100) for a Fabry-Perot interferometer (300) includes
a substrate (50), which includes silicon (Si),
a semi-transparent reflective coating (110) implemented on the substrate (50),
a de-coupling structure (DC1) formed on the substrate (50),
a first sensor electrode (G1$a$) formed on top of the de-coupling structure (DC1), and
a second sensor electrode (G1$b$),
wherein the de-coupling structure (DC1) includes an electrically insulating layer (60$a$), and a first stabilizing electrode (G0$a$), which is located between the first sensor electrode (G1$a$) and the substrate (50).

13 Claims, 12 Drawing Sheets

(56) References Cited

U.S. PATENT DOCUMENTS

| | | | |
|---|---|---|---|
| 2010/0027010 A1* | 2/2010 | Matsumoto | G01J 3/26 356/416 |
| 2011/0019202 A1 | 1/2011 | Iwaki et al. | |
| 2012/0050742 A1* | 3/2012 | Sano | G01J 3/26 356/416 |
| 2012/0212822 A1* | 8/2012 | Kitahara | G01J 3/26 359/578 |
| 2013/0044377 A1* | 2/2013 | Nishimura | G01J 3/26 359/578 |
| 2013/0083399 A1 | 4/2013 | Hirokubo et al. | |
| 2014/0327895 A1 | 11/2014 | Waldis et al. | |
| 2014/0368825 A1 | 12/2014 | Rissanen et al. | |

FOREIGN PATENT DOCUMENTS

| | | |
|---|---|---|
| EP | 2816389 A1 | 12/2014 |
| JP | S62257032 A | 11/1987 |

OTHER PUBLICATIONS

Communication of Acceptance under section 29a of Patents Decree; Finnish Patent and Registration Office; Apr. 6, 2017; Patent Application No. 20146151; 63 pages.

Notification under Section 19 of Patents Act-application can be accepted; Finnish Patent and Registration Office; May 15, 2017; Patent Application No. 20146151; 1 page.

Letters Patent-Finland; Finnish Patent and Registration Office; May 31, 2017; Patent Application No. 20146151; 62 pages.

Chinese Patent Office, Office Action, Application No. 201580077176X, dated Feb. 5, 2018, 5 pages.

Mao et al. "Towards longwave infrared tuneable filters for multispectral thermal imaging applications" School of Electrical, Electronics and Computer Engineering, The University of Western Australia, In Proceeding of 12th International Conference on Quantitative InfraRed Thermography (QIRT) Jul. 11, 2014, 7 pages.

International Search Report, Application No. PCT/FI2015/050909, dated Feb. 15, 2016, 4 pages.

Finnish Patent and Registration Office, Office Action and Search Report, Application No. 20146151, dated Aug. 3, 2015,8 pages.

Written Opinion of the International Searching Authority, Application No. PCT/FI2015/050909, dated Feb. 16, 2016, 7 pages.

\* cited by examiner

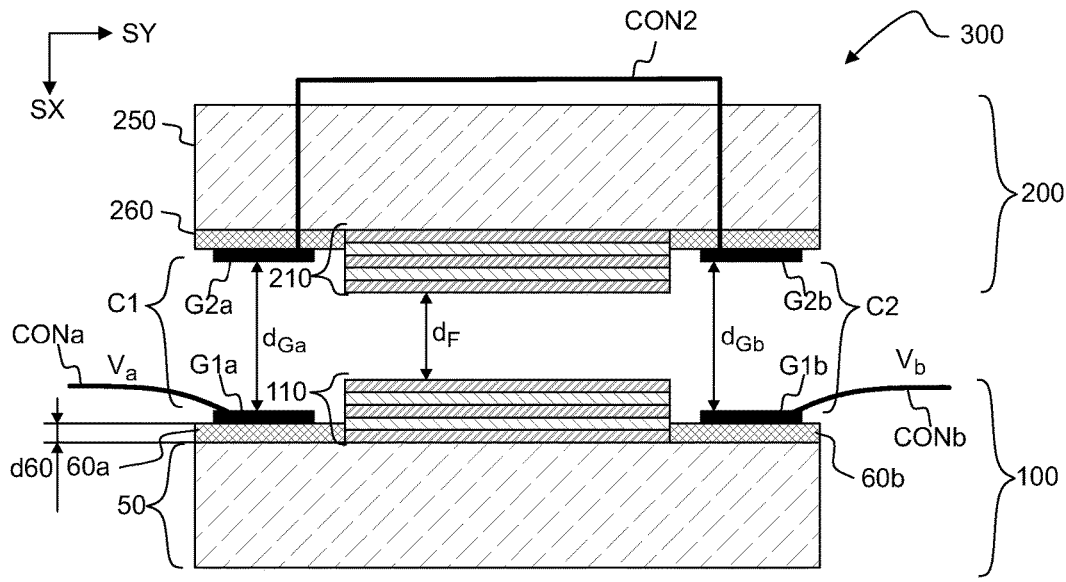
Comparative Example  Fig. 4a
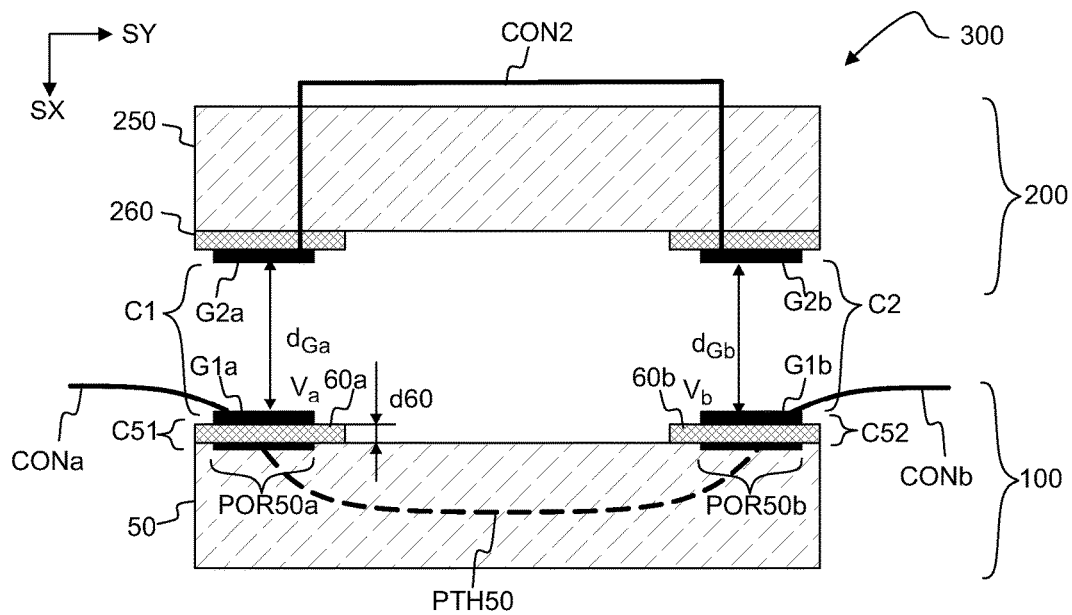
Comparative Example  Fig. 4b

Comparative Example

MIRROR PLATE FOR AN OPTICAL INTERFEROMETER AND AN OPTICAL INTERFEROMETER

FIELD

Some variations relate to a Fabry-Perot interferometer.

BACKGROUND

A Fabry-Perot interferometer comprises a first semi-transparent mirror and a second semi-transparent mirror, which are arranged to form an optical cavity. The Fabry-Perot interferometer may provide one or more transmission peaks. The spectral position of a transmission peak may be changed by changing the distance between the mirrors. The distance between the mirrors may be called as the mirror gap or as the mirror spacing. Performing a spectral measurement may comprise determining the spectral position of the transmission peak. The interferometer may comprise a capacitive sensor for monitoring the adjustable mirror gap. The spectral position of a transmission peak of the interferometer may be determined by e.g. monitoring the capacitance of the capacitive sensor.

SUMMARY

Some variations relate to a Fabry-Perot interferometer. Some variations relate to a mirror plate for a Fabry-Perot interferometer. Some variations relate to an apparatus comprising a Fabry-Perot interferometer. Some variations relate to a method of producing a mirror plate for a Fabry-Perot interferometer. Some variations relate to a method for determining a spectral position of a Fabry-Perot interferometer. Some variations relate to a method of producing a Fabry-Perot interferometer. Some variations relate to measuring spectral data by a Fabry-Perot interferometer. Some variations relate to calibrating a Fabry-Perot interferometer.

According to an aspect, there is provided a mirror plate (100) for a Fabry-Perot interferometer (300), the mirror plate (100) comprising:
  a substrate (50), which comprises silicon (Si),
  a semi-transparent reflective coating (110) implemented on the substrate (50),
  a de-coupling structure (DC1) formed on the substrate (50),
  a first sensor electrode (G1a) formed on top of the de-coupling structure (DC1), and
  a second sensor electrode (G1b),
wherein the de-coupling structure (DC1) comprises an electrically insulating layer (60a), and a first stabilizing electrode (G0a), which is located between the first sensor electrode (G1a) and the substrate (50).

According to an aspect, there is provided a method for producing a mirror plate (100) for a Fabry-Perot interferometer (300), the method comprising:
  providing a substrate (50), which comprises silicon,
  implementing a semi-transparent reflective coating (110) on the substrate (50),
  forming a de-coupling structure (DC1) on the substrate (50),
  forming a first sensor electrode (G1a) on top of the de-coupling structure (DC1), and
  forming a second sensor electrode (G1b) supported by the substrate (50),
wherein the de-coupling structure (DC1) comprises an electrically insulating layer (60a), and a first stabilizing electrode (G0a), which is located between the first sensor electrode (G1a) and the substrate (50).

According to an aspect, there is provided a Fabry-Perot interferometer (300), which comprises a first mirror plate (100) and a second mirror plate (200), the first mirror plate (100) comprising:
  a substrate (50), which comprises silicon,
  a semi-transparent reflective coating (110) implemented on the substrate (50),
  a de-coupling structure (DC1) formed on or in the substrate (50),
  a first sensor electrode (G1a) formed on top of the de-coupling structure (DC1), and
  a second sensor electrode (G1b),
the second mirror plate (200) comprising a third sensor electrode (G2a) and a fourth sensor electrode (G2b) such that the first sensor electrode (G1a) and the third sensor electrode (G2a) form a first sensor capacitor (C1), the second sensor electrode (G1b) and the fourth sensor electrode (G2b) form a second sensor capacitor (C2), the capacitance ($C_1$) of the first sensor capacitor (C1) is indicative of the mirror gap ($d_F$) of the Fabry-Perot interferometer (300), wherein the de-coupling structure (DC1) comprises an electrically insulating layer (60a), and a first stabilizing electrode (G0a), which is located between the first sensor electrode (G1a) and the substrate (50).

The de-coupling structure may be arranged to reduce or prevent coupling from the first sensor electrode to the second sensor electrode via the silicon substrate. A mirror plate of a Fabry-Perot interferometer may comprise one or more de-coupling structures to improve measurement accuracy.

The Fabry-Perot interferometer comprises a first mirror plate and a second mirror plate. The spectral position of the transmission peak of the interferometer may be changed by changing the mirror gap. The interferometer may comprise sensor electrodes for monitoring the mirror gap. The sensor electrodes may form a sensor capacitor such that the capacitance of the sensor capacitor depends on the mirror gap. A change of the mirror gap may change the distance between the sensor electrodes. Changing the distance between the sensor electrodes may change the capacitance of the sensor capacitor. Consequently, the capacitance of the sensor capacitor may depend on the mirror gap such that the mirror gap may be monitored based on the capacitance of the sensor capacitor.

The reflective coating and the sensor electrodes of a mirror plate may be implemented on a silicon substrate e.g. in order to provide a highly stable structure at low manufacturing costs. The interferometer may be a microelectromechanical system (MEMS). The silicon may be substantially transparent at wavelengths longer than 1.1 µm. Consequently, the interferometer may be suitable for use in the infrared region. When compared with borosilicate glass, the spectral absorbance of silicon may be substantially lower than the spectral absorbance of low expansion borosilicate glass ("BK7") at wavelengths longer than 2 µm. However, the proximity of the silicon substrate may disturb operation of capacitive sensor electrodes. The electrical conductivity of the silicon may depend on the operating temperature, and the sensor electrodes may be coupled to the substrate. The sensor electrodes may be coupled to each other via the substrate. The coupling to the substrate may cause temperature-dependent error in monitoring the mirror gap. The varying electrical conductivity of the substrate may disturb the capacitive monitoring of the mirror gap. The interferometer may comprise one or more de-coupling structures, which may be arranged to suppress or eliminate the disturbing effect.

The de-coupling structures may comprise an insulating layer and a stabilizing electrode. The stabilizing electrode may be formed between a sensor electrode and the substrate in order to de-couple the sensor electrode from the substrate. The insulating layer may insulate a sensor electrode from the stabilizing electrode. The stabilizing electrode may be kept at a fixed potential in order to de-couple the sensor electrode from the substrate. In particular, the stabilizing electrode may be grounded. The stabilizing electrode may eliminate capacitive cross talk between a sensor electrode and the substrate. The stabilizing electrode may stabilize the magnitude of a leakage current from a sensor electrode. Thanks to the stabilizing electrode, an unknown and/or varying leakage current from a sensor electrode to the substrate may be replaced by a well-defined leakage current. In an embodiment, the leakage current may be completely eliminated.

BRIEF DESCRIPTION OF THE DRAWINGS

In the following examples, the embodiments will be described in more detail with reference to the appended drawings, in which.

DETAILED DESCRIPTION

Figure 1:
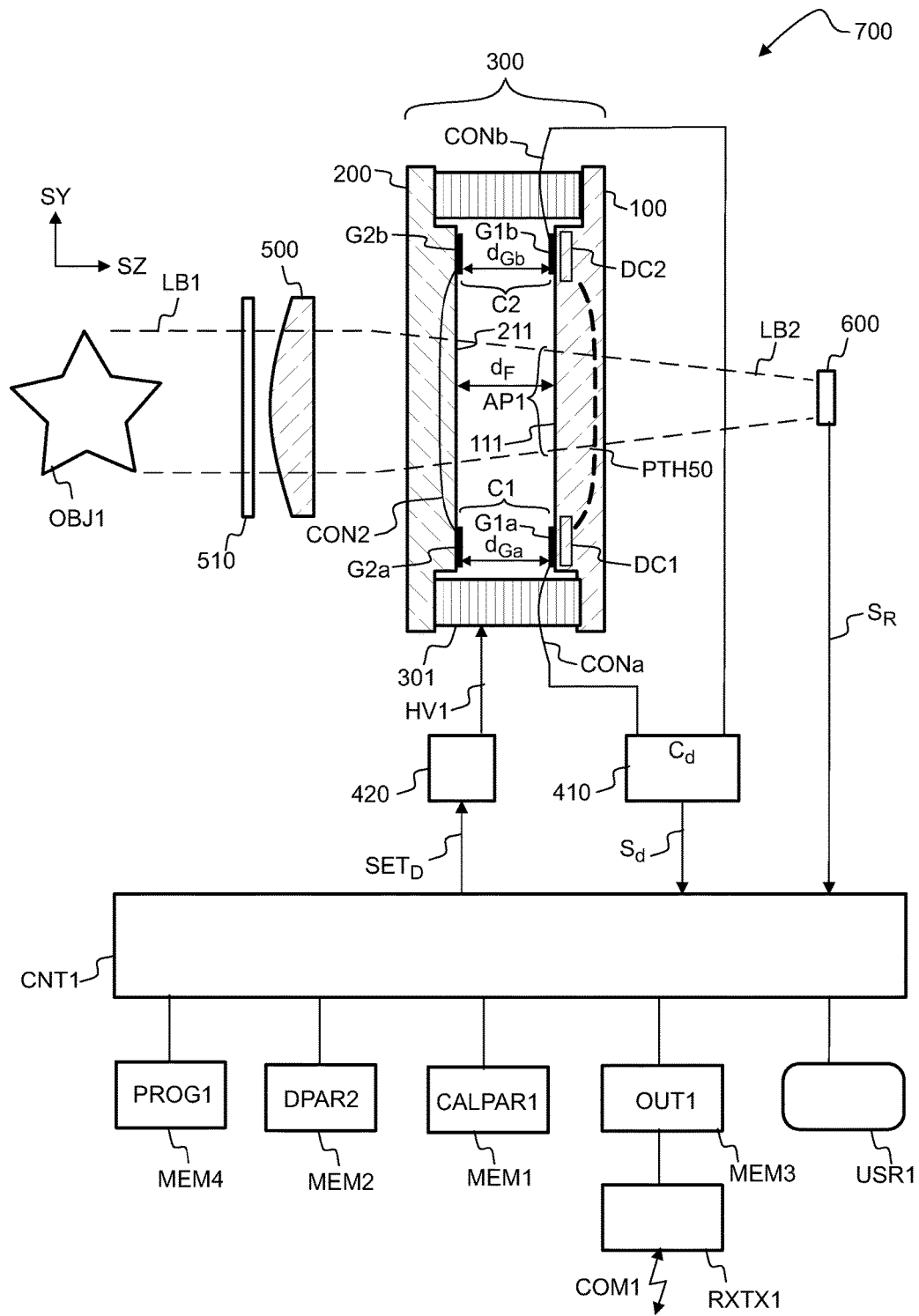
FIG. 1 shows, by way of example, in a cross-sectional side view, a spectrometer, which comprises a Fabry-Perot interferometer.

Referring to FIG. 1, a spectrometer 700 may comprise a Fabry-Perot interferometer 300. An object OBJ1 may reflect, emit and/or transmit light LB1, which may be transmitted through the interferometer 300 in order to monitor the spectrum of the light LB1. The interferometer 300 may be used e.g. for measuring reflection, transmission (absorption) and/or emission of the light LB1 of the object OBJ1.

The Fabry-Perot interferometer 300 comprises a first mirror plate 100 and a second mirror plate 200. The first mirror plate 100 may comprise a semi-transparent reflective coating, which has an outer layer 111. The first mirror plate 100 may have an aperture portion AP1 for transmitting and/or reflecting light LB1. The aperture portion AP1 may be an exposed portion of the semi-transparent reflective coating, which is capable of transmitting and/or reflecting light LB1. Light LB1 impinging on the aperture portion AP1 may be transmitted through the aperture portion AP1 and/or light LB1 impinging on the aperture portion AP1 may be reflected by the aperture portion AP1. The mirror gap $d_F$ may be adjusted to provide constructive interference for transmitted light at a given wavelength so that the aperture portion AP1 may transmit light. On the other hand, the mirror gap $d_F$ may be selected to provide destructive interference for transmitted light at the given wavelength so that the aperture portion AP1 may reflect light.

The width of the aperture portion AP1 may be e.g. in the range of 0.5 mm to 2.0 mm, in the range of 2 mm to 20 mm, in the range of 20 mm to 50 mm, or in the range of 50 mm to 100 mm. The width of the aperture portion AP1 may be e.g. in the range of 0.5 mm to 50 mm. The width of the aperture portion AP1 may be e.g. in the range of 2.0 mm to 50 mm. The aperture portion AP1 may have e.g. a substantially circular form or a substantially rectangular form.

The second mirror plate 200 may comprise a semi-transparent reflective coating, which has an outer layer 211. The outer layer 211 of the second plate 200 may be opposite the outer layer 111 of the first plate 100.

The interferometer 300 may comprise sensor electrodes G1a, G2a, G1b, G2b for capacitively monitoring the mirror gap $d_F$. Sensor electrodes G1a, G1b may be attached to the first mirror plate 100. Sensor electrodes G2a, G2b may be attached to the second mirror plate 200. The electrodes G1a, G2a may form a first sensor capacitor C1. The electrodes G1b, G2b may form a second sensor capacitor C2. The distance $d_{Ga}$ between the electrodes G1a, G2a may depend on the mirror gap $d_F$, and the capacitance $C_1$ of the first sensor capacitor C1 may depend on the distance $d_{Ga}$ such that the mirror gap $d_F$ may be monitored by monitoring the capacitance $C_1$ of the first sensor capacitor C1. The distance $d_{Gb}$ between the electrodes G1b, G2b may depend on the mirror gap $d_F$, and the capacitance C2 of the second sensor capacitor C2 may depend on the distance $d_{Gb}$ such that the mirror gap $d_F$ may be monitored also by monitoring the capacitance C2 of the second sensor capacitor C2.

The mirror gap $d_F$ may depend on the distance $d_{Ga}$ and/or on the on the distance $d_{Gb}$. The mirror gap $d_F$ may be monitored by monitoring the capacitance $C_1$ and/or $C_2$. The distance $d_{Ga}$ between the sensor electrodes G1a, G2a may also be called as the electrode gap.

The sensor capacitors C1, C2 may be connected to a capacitance monitoring unit 410 e.g. by conductors CONa, CONb. The mirror plate 200 may move with respect to the mirror plate 100. The sensor capacitors C1, C2 may be connected in series e.g. in order to avoid using a moving electrical conductor between the mirror plate 200 and the capacitance monitoring unit 410. The sensor capacitors C1, C2 may be connected in series e.g. by a conductor CON2. The electrode G2a may be galvanically connected to the electrode G2b by the conductor CON2.

The substrate 50 may provide a semi-conductive path PTH50, which may disturb capacitive monitoring of the mirror gap $d_F$. The semi-conductive path PTH50 may cause temperature-dependent coupling between the sensor electrodes G1a, G1b. The semi-conductive path PTH50 may also cause temperature-dependent leakage current from the sensor electrode G1a, G1b. The mirror plate 100 may comprise one or more de-coupling structures DC1, DC2, which may be arranged to reduce or eliminate the disturbing effect of the semi-conductive path PTH50.

The Fabry-Perot interferometer 300 may comprise a first mirror plate 100 and a second mirror plate 200. The first mirror plate 100 may comprise:
- a substrate 50, which comprises silicon,
- a semi-transparent reflective coating 110 implemented on the substrate 50,
- a de-coupling structure DC1 formed on or in the substrate 50, and
- a first sensor electrode G1a formed on top of the de-coupling structure DC1, and
- a second sensor electrode G1b.

The second mirror plate 200 may comprise a third sensor electrode G2a and a fourth sensor electrode G2b such that the first sensor electrode G1a and the third sensor electrode G2a form a first sensor capacitor C1, the second sensor electrode G1b and the fourth sensor electrode G2b form a second sensor capacitor C2, the first sensor capacitor C1 and the second sensor capacitor C2 may be connected in series, the capacitance $C_1$ of the first sensor capacitor C1 may be indicative of the mirror gap $d_F$ of the Fabry-Perot interferometer 300.

The electrodes G1a, G1b and the substrate may together form a combination, which has parasitic impedance. The reactive part of said parasitic impedance may be represented by a parasitic capacitance $C_{PAR}$. The electrode G1a and the substrate may form a first parasitic capacitor. The electrode G1b and substrate the may form a second parasitic capacitor. The first and the second parasitic capacitors may be connected in series by the semi-conducting path PTH50 such that the parasitic capacitance $C_{PAR}$ of the combination may be equal to e.g. 50% of the capacitance of the first parasitic capacitor. The de-coupling structures DC1, DC2 may be arranged to eliminate the effect of the parasitic impedance. The de-coupling structure may comprise an insulating layer and a stabilizing electrode. The dimensions and the position of the stabilizing electrode may be selected such that the thermally induced change of reactance between the first sensor electrode and the second sensor electrode is smaller than e.g. 0.1% of a reference value when the temperature of the substrate is changed by 1° C.

The parasitic impedance may have a reactance $X_{PAR}$ (i.e. a reactive part). The capacitance $C_{PAR}$ and/or the reactance $X_{PAR}$ may be measured e.g. by applying a sinusoidal test voltage $V_{TEST}$ between the first sensor electrode G1a and the second sensor electrode G1b. The RMS voltage of the sinusoidal test voltage $V_{TEST}$ may be e.g. 1 V, and the frequency of the sinusoidal test voltage $V_{TEST}$ may be e.g. 10 kHz. RMS means root mean square.

The reactance $X_{PAR}$ may depend on the parasitic capacitance $C_{PAR}$ according to the following equation:

$$X_{PAR} = \frac{1}{2\pi f \cdot C_{PAR}} \tag{1a}$$

The test frequency f may be e.g. equal to 10 kHz.

The thermally induced change $\Delta X_{PAR}$ of the reactance $X_{PAR}$ may be compared with a reference reactance $X_{REF}$. The reference reactance $X_{REF}$ may be e.g. equal to the reactance $X_1$ of the first sensor capacitor C1 in a situation where the test frequency f is equal to a reference frequency, and where the electrodes G1a, G2a are separated by a reference distance.

The capacitance $C_1$ of the first sensor capacitor C1 may be approximated by the following equation:

$$C_1 \approx \frac{\varepsilon \cdot A}{d_{Ga}} \tag{1b}$$

where $\varepsilon$ denotes the dielectric permittivity of vacuum, A denotes the area of the first sensor electrode G1a, and $d_{Ga}$ denotes the distance between the electrodes G1a, G2a.

The reactance $X_1$ of the first sensor capacitor C1 may be calculated according to the following equation:

$$X_1 = \frac{1}{2\pi f \cdot C_1} \tag{1c}$$

$$X_1 = \frac{1}{2\pi f \cdot \left(\frac{\varepsilon \cdot A}{d_{Ga}}\right)} \tag{1d}$$

A reference reactance $X_{REF}$ may be calculated from equation (1d) e.g. by assuming that a reference distance ($d_{Ga}$) between the electrodes G1a, G2a is equal to 50 μm, and that the reference frequency (f) is equal to 10 kHz:

$$X_{REF} = \frac{1}{2\pi \cdot 10 \text{ kHz} \cdot \left(\frac{\varepsilon \cdot A}{50 \text{ μm}}\right)} \tag{1e}$$

The de-coupling structure DC1 may be implemented such that the thermally induced change $\Delta X_{PAR}$ of the reactance $X_{PAR}$ is e.g. smaller than 0.1% of the reference reactance $X_{REF}$, when distance $d_{Ga}$ is kept constant and the temperature is changed by 1° C.

The first mirror plate 100 may comprise:
- a substrate 50, which comprises silicon Si,
- a semi-transparent reflective coating 110 implemented on the substrate 50,
- a de-coupling structure DC1 formed on or in the substrate 50,
- a first sensor electrode G1a formed on top of the de-coupling structure DC1, and
- a second sensor electrode G1b, wherein the de-coupling structure (DC1) comprises an electrically insulating layer 60a, and the electrically insulating layer 60a has been formed such that a thermally induced change $\Delta X_{PAR}$ of reactance $X_{PAR}$ between the first sensor electrode G1a and the second sensor electrode G1b is smaller than 0.1% of a reference value $X_{REF}$ when the temperature of the substrate 50 is changed by 1° C., wherein the reactance $X_{PAR}$ is determined at the frequency of 10 kHz, and the reference value $X_{REF}$ is calculated according to the following equation:

$$X_{REF} = \frac{1}{2\pi \cdot 10 \text{ kHz} \cdot \left(\frac{\varepsilon \cdot A}{50 \text{ μm}}\right)} \quad (1f)$$

where ε denotes the dielectric permittivity of vacuum, and A denotes the area of the first sensor electrode G1a.

The sensor electrodes of the first mirror plate 100 may be connected to a capacitance monitoring unit 410 in order to monitor the capacitances of the capacitors C1, C2. The capacitance value of the capacitor C1 and/or C2 may be indicative of the mirror gap $d_F$. The capacitance monitoring unit 410 may provide a sensor signal $S_d$ indicative of the capacitance of a capacitor circuit, which comprises the capacitors C1 and C2. The capacitance monitoring unit 410 may provide a sensor signal $S_d$ indicative of the mirror gap $d_F$. The capacitance monitoring unit 410 may provide a sensor signal $S_d$ indicative of the spectral position of a transmission peak PEAK1 (see FIG. 2). The sensor signal $S_d$ may also be called as a feedback signal.

When connected in series, the first sensor capacitor C1 and the second sensor capacitor C2 may together form a sensor capacitor system, which has a capacitance $C_d$. The capacitance monitoring unit 410 may be arranged to monitor the capacitance $C_d$ e.g. by charging the sensor capacitor system with a predetermined current, and by measuring the time needed to charge the sensor capacitor system to a predetermined voltage. The capacitance monitoring unit 410 may be arranged to monitor the capacitance $C_d$ e.g. by coupling the sensor capacitor system as a part of a resonance circuit, and by measuring the resonance frequency of the resonance circuit. The capacitance monitoring unit 410 may be arranged to monitor the capacitance $C_d$ e.g. by using the sensor capacitor system to repetitively transfer charge to an auxiliary tank capacitor, and counting the number of charge transfer cycles needed to reach a predetermined tank capacitor voltage. The capacitance monitoring unit 410 may be arranged to monitor the capacitance $C_d$ e.g. by comparing the capacitance of the sensor capacitor system with a reference capacitor.

The mirror gap $d_F$ may be adjusted by one or more actuators 301. One or more actuators 301 may be arranged to move the second mirror plate 200 with respect to the first mirror plate 100. The actuator 301 may be e.g. a piezoelectric actuator, an electrostatic actuator, an electrostrictive actuator, or a flexoelectric actuator. The reflective coatings of the mirror plates 100, 200 may be substantially flat and substantially parallel to each other. The flatness of the aperture portion AP1 of the mirror plate 100 may be e.g. better than $\lambda_N/20$, better than $\lambda_N/50$, better than $\lambda_N/100$ or even better than $\lambda_N/200$, in order to provide a suitable finesse (i.e. the ratio of the free spectral range to the spectral width of a transmission peak). $\lambda_N$ denotes a predetermined operating wavelength. When operating in the infrared region, the predetermined operating wavelength $\lambda_N$ may be e.g. 2000 nm or 4000 nm. In particular, the predetermined operating wavelength $\lambda_N$ may be equal to $(\lambda_{min}+\lambda_{max})/2$, where $\lambda_{min}$ and $\lambda_{max}$ denote the cut-off wavelengths $\lambda_{min}$ and $\lambda_{max}$ of the interferometer (See FIG. 2). When the flatness is better than $\lambda_N/100$, this means that the RMS deviation of the local height of the surface of the mirror from a hypothetical flat reference surface is smaller than $\lambda_N/100$. RMS means root mean square.

The spectrometer 700 may comprise a control unit CNT1. The control unit CNT1 may be arranged to send a control signal $SET_D$ to the interferometer 300 in order to adjust the mirror gap $d_F$. The interferometer 300 may comprise a driver unit 420. The driver unit 420 may e.g. convert a digital control signal $SET_D$ into an analog signal suitable for driving one or more actuators 301. The driver unit 420 may provide a signal HV1 for driving an actuator 301. The driver unit 420 may provide a high voltage signal HV1 for driving a piezoelectric actuator 301.

The capacitance monitoring unit 410 may provide a sensor signal $S_d$. The sensor signal may be used for monitoring the mirror gap $d_F$. The spectral response of the spectrometer 700 may be calibrated e.g. as a function of the mirror gap $d_F$. The spectrometer 700 may comprise a memory MEM2 for storing spectral calibration parameters DPAR2. The mirror gap $d_F$ and/or a spectral position λ may be determined from the sensor signal $S_d$ e.g. by using the spectral calibration parameters DPAR2.

The Fabry-Perot interferometer 300 may form transmitted light LB2 by filtering the light LB1 obtained from the object OBJ1. The spectrometer 700 may comprise an optical detector 600. The interferometer 300 may be optically coupled to the detector 600. The transmitted light LB2 may impinge on the detector 600.

The optical detector 600 may be an image sensor or a non-imaging detector. For non-imaging spectral analysis, the sensor 600 may be a non-imaging detector. A non-imaging detector may provide an intensity signal, which is indicative of the intensity of the transmitted light LB2. The optical detector 600 may be arranged to provide a signal $S_R$, which is indicative of the intensity of the transmitted light LB2.

The spectrometer 700 may optionally comprise imaging optics 500. The imaging optics 500 may be arranged to focus light LB2 to the image sensor 600. The transmitted light LB2 may form an optical image, which may be captured by the image sensor 600. The imaging optics 500 may be arranged to form one or more two-dimensional optical images of the object OBJ1 on the image sensor 600.

The image sensor 600 may be arranged to convert an optical image of the object OBJ1 into a digital image. The image sensor 600 may be arranged to capture a digital image of the object OBJ1. The image sensor 600 may comprise a plurality of detector pixels. Each detector pixel may be arranged to provide a signal $S_R$, which is indicative of intensity impinging on said pixel. The image sensor 600 may be e.g. a CMOS image sensor Complementary Metal Oxide Semiconductor) or a CCD image sensor (Charge Coupled Device).

The imaging optics 500 may comprise e.g. one or more refractive lenses and/or one or more reflective surfaces (e.g. a paraboloid reflector). The imaging optics 500 may be positioned e.g. between the interferometer 300 and the image sensor 600 and/or between the object OBJ1 and the interferometer 300. One or more components of the imaging optics 500 may also be positioned before the interferometer 300 and one or more components of the imaging optics 500 may be positioned after the interferometer 300. The optics 500 may be omitted e.g. when the spectrometer 700 is used for non-imaging spectral analysis. However, the imaging optics 500 may also be used to focus transmitted light LB2 to a non-imaging detector 600.

The spectrometer 700 may be arranged to measure spectral intensities e.g. in the infrared region. The image sensor 600 may be sensitive e.g. in the infrared region.

The spectrometer 700 may optionally comprise a memory MEM1 for storing intensity calibration parameters CALPAR1. The spectrometer 700 may be arranged to obtain detector signal values $S_R$ from the detector 600, and to determine intensity values $X(\lambda)$ from the detector signal values $S_R$ by using one or more intensity calibration parameters CALPAR1. At each mirror gap $d_F$, an intensity value $X(\lambda)$ of the light LB1 may be determined from a detector signal $S_R$ by using the one or more intensity calibration parameters CALPAR1. For example, a signal $S_R(\lambda)$ may be substantially proportional to the intensity impinging on the detector 600 or on a single detector pixel of the detector 600 when the interferometer has been adjusted to the spectral position $\lambda_0$. The intensity calibration parameters CALPAR1 may comprise one or more parameters, which define an intensity calibration function $Q_{Rn}(\lambda)$. The intensity $X(\lambda)$ may be determined from the signal $S_R(\lambda)$ e.g. by the equation:

$$X(\lambda)=Q_{Rn}(\lambda)\cdot S_R(\lambda) \qquad (2)$$

The spectrometer 700 may optionally comprise a memory MEM3 for storing output OUT1. The output OUT1 may comprise e.g. detector signals $S_R$ and/or intensity values determined from the detector signals. The output OUT1 may comprise one or more digital images of the object OBJ1.

The spectrometer 700 may comprise a memory MEM4 for storing a computer program PROG1. The computer program PROG1 may be configured, when executed by one or more data processors (e.g. CNT1), cause the apparatus 300, 700 to determine one or more spectral positions $\lambda$ by monitoring the capacitance of the sensor capacitors C1, C2. One or more spectral positions $\lambda$ may be determined by monitoring the capacitance of the sensor capacitors C1, C2, and by using the spectral calibration data DPAR2.

The computer program PROG1 may be configured, when executed by one or more data processors (e.g. CNT1), to obtain one or more detector signal values $S_R$ from the optical sensor 600, and to determine one or more intensity values $X(\lambda)$ from the detector signal values $S_R$ by using intensity calibration parameters CALPAR1. The spectrometer 700 may be arranged to provide one or more intensity values $X(\lambda)$. In an embodiment, the spectrometer 700 may be arranged to compare a measured intensity value $X(\lambda)$ with a reference value. In an embodiment, the spectrometer 700 may be arranged to compare a ratio of measured intensity values with a reference value.

The spectrometer 700 may optionally comprise a user interface USR1 e.g. for displaying information to a user and/or for receiving commands from the user. The user interface USR1 may comprise e.g. a display, a keypad and/or a touch screen.

The spectrometer 700 may optionally comprise a communication unit RXTX1. The communication unit RXTX1 may transmit and/or receive a signal COM1 e.g. in order to receive commands, to receive calibration data, and/or to send output data OUT1. The communication unit RXTX1 may have e.g. wired and/or wireless communication capabilities. The communication unit RXTX1 may be arranged to communicate e.g. with a local wireless network (WLAN), with the Internet and/or with a mobile telephone network.

The spectrometer 700 may be implemented as a single physical unit or as a combination of separate units.

The spectrometer 700 may optionally comprise one or more optical cut-off filters 510 to limit the spectral response of the detector 600. The one or more filters 510 may define the spectral range of the spectrometer 700. The one or more filters 510 may be positioned before and/or after the interferometer 300.

Figure 2:
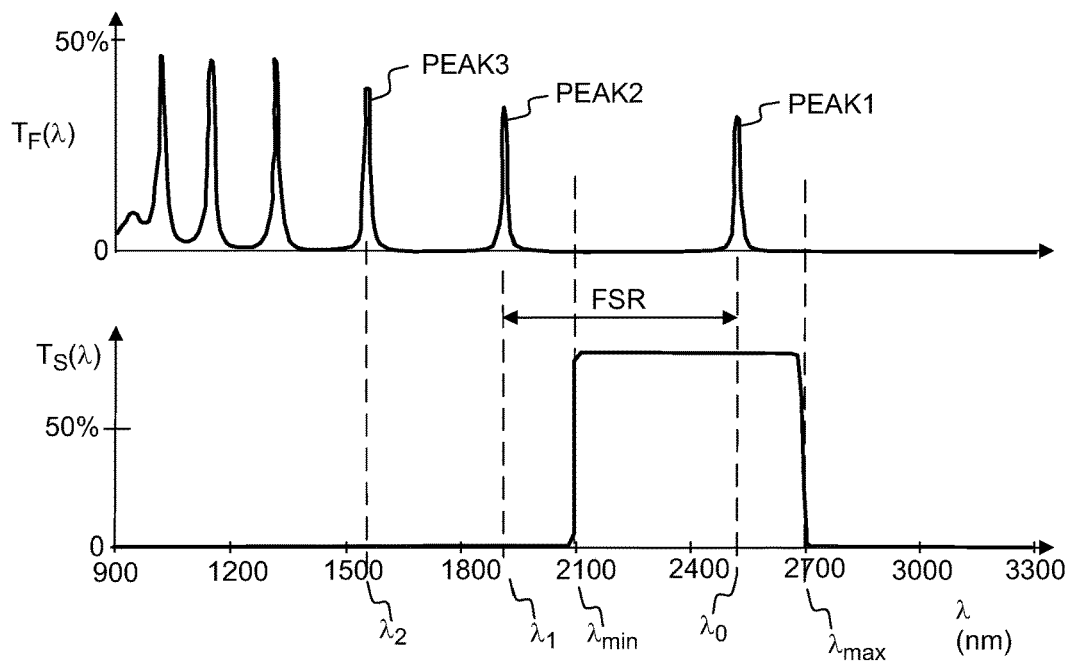
FIG. 2 shows, by way of example, spectral transmittance peaks of a Fabry-Perot interferometer.

The spectrometer 700 may optionally comprise e.g. a lens and/or an aperture, which is arranged to limit the divergence of the light LB2 transmitted through the interferometer 300, in order to provide a narrow bandwidth for the transmission peak PEAK1 (FIG. 2). For example, the divergence of the light LB2 may be limited to be smaller than or equal to 10 degrees. When using focusing optics 500, the optics 500 may also be positioned between the interferometer 300 and the sensor 600 in order to minimize divergence of light in the optical cavity formed by the mirror plates 100, 200.

The reverse side of the mirror plate 100 and/or 200 may be optionally coated with an anti-reflection coating.

For some applications, it is not necessary to determine calibrated intensity values. For example, the spectral position (wavelength) of a laser beam may also be measured by the spectrometer 700 by using the spectral calibration data DPAR2, without using the intensity calibration data CALPAR1.

SX, SY and SZ denote orthogonal directions. The light LB2 may propagate substantially in the direction SZ.

FIG. 2 shows, by way of example, the spectral transmittance of a Fabry-Perot interferometer 300, and the pass band of an optional filter 510. The uppermost curve of FIG. 2 shows the spectral transmittance $T_F(\lambda)$ of the Fabry-Perot interferometer 300. The spectral transmittance $T_F(\lambda)$ may have one or more adjacent transmittance peaks PEAK1, PEAK2, PEAK3 of the Fabry-Perot interferometer 300. For example, a first transmittance peak PEAK1 may be at a wavelength $\lambda_0$, a second transmittance peak PEAK2 may be at a wavelength $\lambda_1$, and a third transmittance peak PEAK1 may be at a wavelength $\lambda_2$. The spectral positions $\lambda_0, \lambda_1, \lambda_2$ of the transmission peaks PEAK1, PEAK2, PEAK3 may depend on the mirror gap $d_F$ according to the Fabry-Perot transmission function. The spectral position of the first peak PEAK1 may be a function $\lambda_0(d_F)$ of the mirror gap $d_F$. The spectral position of the second peak PEAK2 may be a function $X_1(d_F)$ of the mirror gap $d_F$. The spectral position of the third peak PEAK3 may be a function $\lambda_2(d_F)$ of the mirror gap $d_F$. The spectral positions of the transmission peaks may be changed by changing the mirror gap $d_F$. The spectral positions of the transmission peaks may be changed by tuning the mirror gap $d_F$.

The transmission peaks PEAK1, PEAK2, PEAK3 may also be called as passbands of the Fabry-Perot interferometer. The spectral positions $\lambda_0, \lambda_1, \lambda_2$ may be shifted by changing the mirror gap $d_F$. The free spectral range FSR between adjacent peaks may depend on the mirror gap $d_F$. The Fabry Perot interferometer may comprise capacitive electrodes G1a, G2a, G1b, G2b for monitoring the spectral position of at least one transmission peak PEAK1.

The spectral position of at least one transmission peak PEAK1 may be monitored by monitoring the capacitance of a sensor capacitor, which comprises the electrodes G1a, G2a.

The spectral position of at least one transmission peak PEAK1 may be determined by monitoring the capacitance of a sensor capacitor, which comprises the electrodes G1a, G2a.

Each transmission peak PEAK1, PEAK2, PEAK3 of the Fabry Perot interferometer may be associated with a specific order of interference. For example, the first transmittance peak PEAK1 may be associated with an order of interference m, the second transmittance peak PEAK2 may be associated with the order of interference m+1, and the third transmittance peak PEAK3 may be associated with the order of interference m+2. The order of interference m may be e.g. a positive integer.

The spectrometer 700 may optionally comprise one or more optical cut-off filters 510 to limit the spectral response of the spectrometer 700. The one or more filters 510 may together provide a spectral transmittance $T_S(\lambda)$. The one or more filters 510 may provide a pass band defined by cut-off wavelengths $\lambda_{min}$ and $\lambda_{max}$.

When the spectral range defined by the wavelengths $\lambda_{min}$ and $\lambda_{max}$ contains only one peak PEAK1, a single intensity value $X(\lambda)$ may be determined from a single detector signal $S_R$ obtained from the detector 600.

In an embodiment, a detector unit 600 may comprise several detectors (e.g. detector pixels), which have two (or more) different spectral sensitivity curves. In that case the spectral range defined by the wavelengths $\lambda_{min}$ and $\lambda_{max}$ may contain two or more peaks PEAK1, PEAK2, and several intensity values (e.g. $X(\lambda_0)$ and $X(\lambda_1)$) may be simultaneously measured by using detector signals obtained from the detectors.

Figure 3:
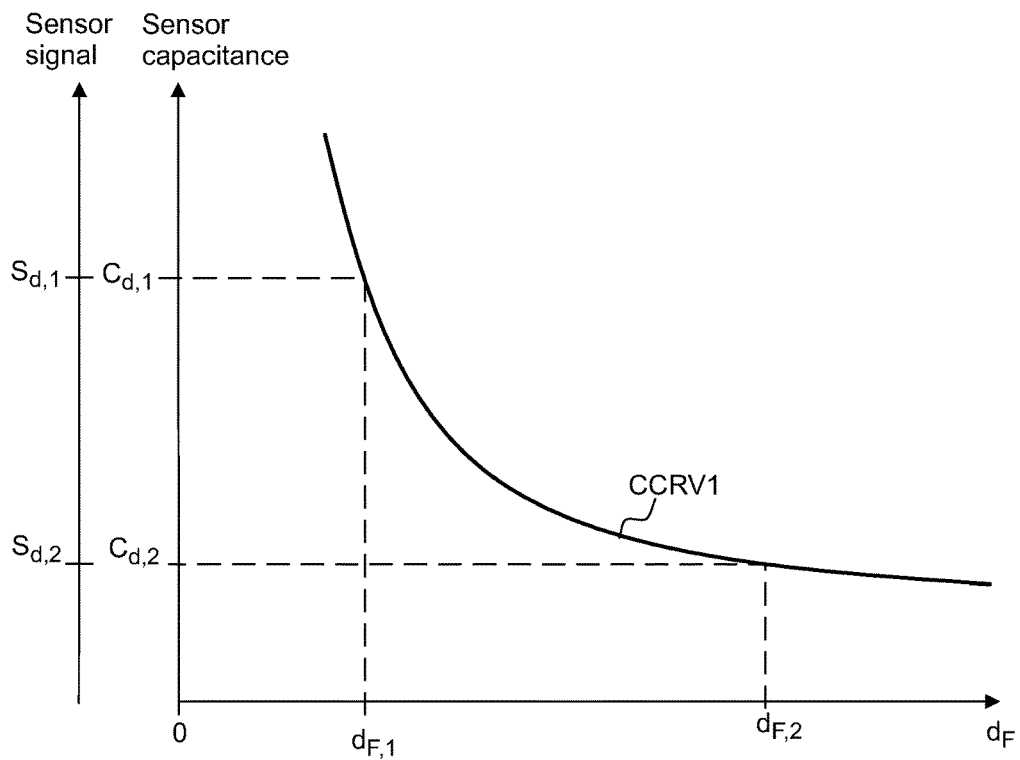
FIG. 3 shows, by way of example, the relationship between the mirror gap and the capacitance of a sensor capacitor.

FIG. 3 shows, by way of example, a relation between the mirror gap $d_F$ and the capacitance value $C_d$ of a sensor capacitor system. The curve CCRV1 of FIG. 3 shows the sensor capacitance $C_d$ as the function of the mirror gap $d_F$. To the first approximation, the value of the sensor capacitance $C_d$ may be inversely proportional to the value of the electrode gap $d_{Ga}$. $C_{d,1}$ denotes the sensor capacitance at the mirror gap value $d_{F,1}$. $C_{d,2}$ denotes the sensor capacitance at the mirror gap value $d_{F,2}$.

The control unit CNT1 may be arranged to determine the value of the mirror gap $d_F$ from the measured value of the sensor capacitance $C_d$. The capacitance monitoring unit 410 may a provide a sensor signal value $S_{d,1}$ when the sensor capacitance has a value $C_{d,1}$. The capacitance monitoring unit 410 may a provide a sensor signal value $S_{d,2}$ when the sensor capacitance has a value $C_{d,2}$.

Referring to the comparative example shown in FIGS. 4a and 4b, a Fabry-Perot interferometer 300 may comprise a first mirror plate 100 and a second mirror plate 200. The first mirror plate 100 may comprise sensor electrodes G1a, G1b. The second mirror plate 200 may comprise sensor electrodes G2a, G2b. The electrodes G1a and G2a may together form a first sensor capacitor C1, which has a capacitance $C_1$. The electrodes G1b and G2b may together form a second sensor capacitor C2, which has a capacitance $C_2$.

The electrodes G1a, G1b may be supported by the substrate 50 of the first mirror plate 100. The electrode G1a may be formed on an insulating layer 60a, which has been implemented on the substrate 50. The electrode G1b may be formed on an insulating layer 60b, which has been implemented on the substrate 50. $d_{60}$ may denote a distance between the electrode G1a and the substrate 50. The electrode G1a may be implemented on the insulating layer 60a e.g. by depositing conductive material on the insulating layer 60a.

The electrodes G1a, G1b may be formed e.g. by physical vapor deposition (PVD), by chemical vapor deposition (CVD), and/or by atomic layer deposition (ALD). In particular, the electrodes G1a, G1b may be formed by sputtering.

The electrodes G2a, G2b of the second mirror plate 200 may be galvanically connected to each other by a conductor CON2.

The insulating layer 60a may be supported by a supporting portion POR50a of the substrate 50. The insulating layer 60b may be supported by a supporting portion POR50b of the substrate 50. The substrate 50 may provide a semiconductive path PTH50, which electrically connects the supporting portion POR50a to the supporting portion POR50b. The substrate 50 may provide a semiconductive path PTH50 between the supporting portions POR50a, POR50b.

The insulating layers 60a, 60b may consist of solid silica ($SiO_2$). The insulating silica layer may be formed e.g. by deposition and/or oxidation. In practice, the insulating silica layer should be formed in a limited time period, e.g. in a few hours. Due to the limited processing time, the thickness of the insulating silica layer is typically smaller than or equal to 2 µm. Increasing the thickness of the silica layer may be difficult or impossible, because it may require excessively long processing times. Due to the thin layers 60a, 60b, the sensor electrode G1a may be capacitively coupled to the sensor electrode G1b via the path PTH50. The impedance of the path PTH50 may depend on the concentration of impurities in the substrate 50. The impedance of the path PTH50 may strongly depend on the temperature. The impedance of the path PTH50 may vary from one substrate 50 to another.

The electrode G1a and the supporting portion POR50a may together form a first parasitic capacitor C51. The electrode G1b and the supporting portion POR50b may together form a second parasitic capacitor C52. The first parasitic capacitor C51 may be connected to the second parasitic capacitor C52 via the path PTH50.

The monitoring unit 410 may be coupled to the electrodes G1a, G1b in order to monitor the mirror gap $d_F$. The monitoring unit 410 may be connected to the electrodes G1a, G1b in order to monitor the mirror gap $d_F$. The monitoring unit 410 may be connected to the electrodes G1a, G1b in order to monitor the capacitance of the capacitor system, which comprises the capacitors C1, C2 connected in series. However, the parasitic capacitors C51, C52 may disturb accurate monitoring of the mirror gap $d_F$. The contribution of the parasitic capacitors C51, C52 to the total capacitance $C_{tot}$ may depend on the operating temperature of the substrate 50. The contribution of the parasitic capacitors C5, C52 may vary from one substrate 50 to another.

Figure 4C:
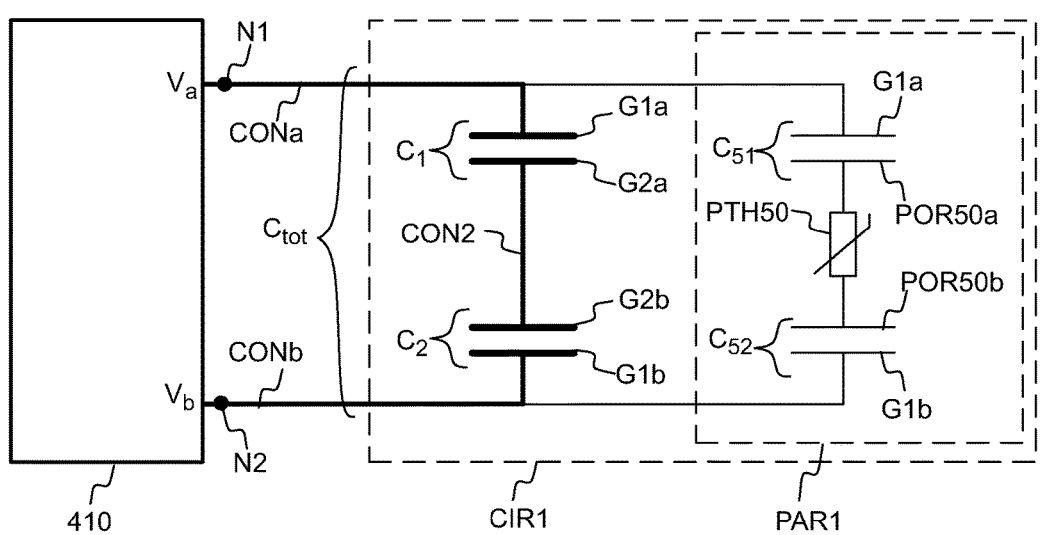
FIG. 4a shows, by way of example, in a cross-sectional side view, a Fabry-Perot interferometer, which comprises parasitic capacitors.
FIG. 4b shows, by way of example, in a cross-sectional side view, the parasitic capacitors of the Fabry-Perot interferometer of FIG. 4a, FIG. 4c shows a capacitor circuit, which represents the interferometer of FIG. 4a, FIG. 5a shows, by way of example, in a cross-sectional side view, a Fabry-Perot interferometer, which comprises stabilizing electrodes, FIG. 5b illustrate, by way of example, an effect of the stabilizing electrodes.

FIG. 4c shows a capacitor circuit CIR1 connected to a capacitance monitoring unit 410. The circuit CIR1 represents the interferometer 300 shown in FIGS. 4a and 4b. The monitoring unit 410 may have input nodes N1, N2. The electrode G1a of the first sensor capacitor C1 may be connected to the input node N1 by the conductor CONa. The electrode G1b of the second sensor capacitor C2 may be connected to the input node N2 by the conductor CONb. The electrode G2a may be connected to the electrode G2b.

A parasitic capacitor circuit PAR1 may comprise the first parasitic capacitor C51 and the second parasitic capacitor C52 such that the parasitic capacitors C51, C52 are connected in series by the semi-conducting path PTH50. The impedance of the semi-conducting path PTH50 may vary. For example, impedance of the semi-conducting path PTH50 may depend on the temperature of the substrate. For example, impedance of the semi-conducting path PTH50 may depend on the current flowing through the path PTH50. The conductivity of the semi-conducting path PTH50 may depend on the temperature.

The parasitic capacitor circuit PAR1 may have a parasitic capacitance $C_{PAR}$.

The total capacitance $C_{tot}$ of the capacitor circuit CIR1 may be approximately equal to the sum of the sensor capacitance value $C_d$ and the parasitic capacitance value $C_{PAR}$.

$$C_{tot} \approx C_d + C_{PAR} \quad (3)$$

The sensor capacitance value $C_d$ may be solved e.g. from the following equation:

$$\frac{1}{C_d} = \frac{1}{C_1} + \frac{1}{C_2} \quad (4)$$

The capacitance $C_1$ of the first sensor capacitor C1 may be substantially equal to the capacitance $C_2$ of the second sensor capacitor C2. In that case the sensor capacitor value $C_d$ may be substantially equal to 50% of the capacitance $C_1$, i.e. $C_d = 0.5 \cdot C_1$.

The effect of the parasitic capacitors C51, C52 on the parasitic capacitance value $C_{PAR}$ may be estimated e.g. by the following approximate equation:

$$\frac{1}{C_{PAR}} \approx \frac{1}{C_{51}} + \frac{1}{C_{52}} \quad (5)$$

Equations (3) and (5) are approximate e.g. due to the impedance between the portions POR50a, POR50b. The impedance of the path PTH50 may cause a difference between the value of $C_{tot}$ calculated by equation (3) and the actual value of the parasitic capacitance value $C_{PAR}$. The impedance of the path PTH50 may cause a difference between the value of $C_{PAR}$ calculated by equation (5) and the actual value of the parasitic capacitance value $C_{PAR}$.

The capacitance $C_{51}$ of the first parasitic capacitor C51 may be substantially equal to the capacitance $C_{52}$ of the second parasitic capacitor C52. In that case the parasitic capacitance value $C_{PAR}$ may be substantially equal to 50% of the capacitance $C_{51}$, i.e. $C_{PAR} = 0.5 \cdot C_{51}$.

The capacitance monitoring unit 410 may be arranged to monitor the total capacitance $C_{tot}$ of the capacitor circuit CIR1. Input nodes N1, N2 of the monitoring unit 410 may be connected to the capacitor circuit CIR1 by conductors CONa, CONb. The parasitic capacitance $C_{PAR}$ may depend e.g. on the temperature of the substrate 50 so that variations of the parasitic capacitance $C_{PAR}$ may disturb monitoring the mirror gap based on the total capacitance $C_{tot}$.

In principle, the operating temperature of the substrate could be measured, and the disturbing effect might be compensated based on the operating temperature by using device-specific calibration data. However, this could increase manufacturing costs of the interferometer, and may make operation of the interferometer more complex.

Figure 5A:
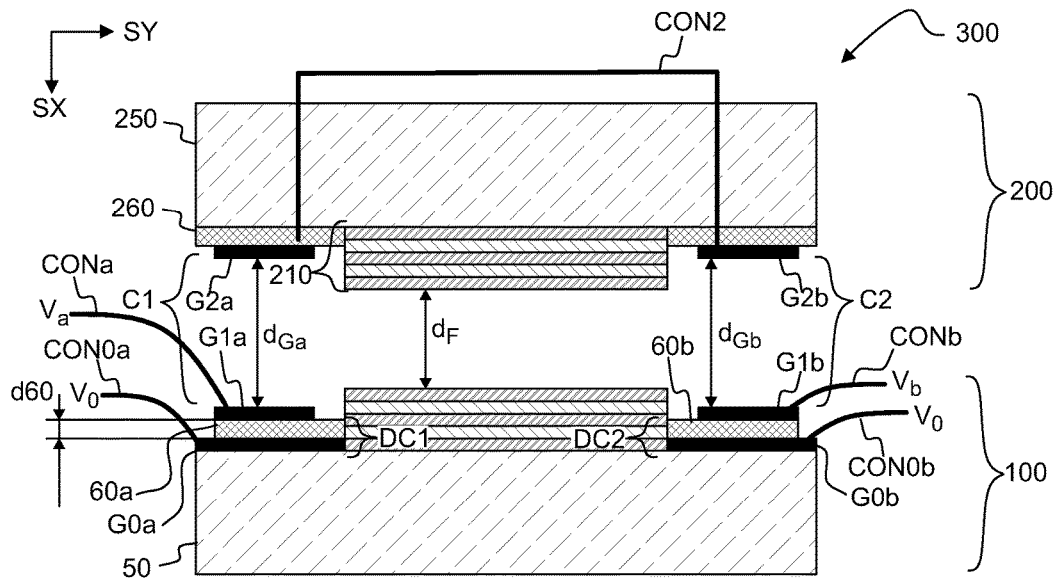
FIG. 5c shows a capacitor circuit, which represents the interferometer of FIG. 5a, FIGS. 6a to 6f shows, by way of example, in a cross-sectional side view, method steps for producing a mirror plate, which comprises stabilizing electrodes.
Figure 5B:
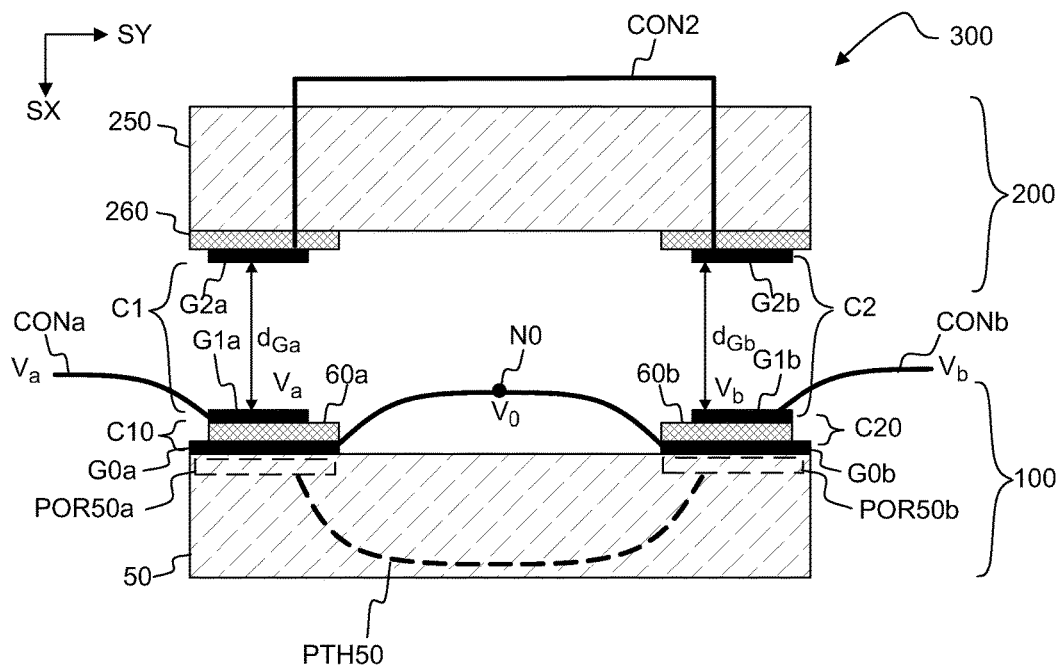

FIGS. 5a and 5b show a Fabry-Perot interferometer, which comprises stabilizing electrodes G0a, G0b. The interferometer 300 may comprise de-coupling structures DC1, DC2, which comprise stabilizing electrodes G0a, G0b. A first de-coupling structure DC1 of the mirror plate 100 may comprise a stabilizing electrode G0a and an insulating layer 60a. A second de-coupling structure DC2 of the mirror plate 100 may comprise stabilizing electrode G0b and an insulating layer 60b. The stabilizing electrode G0a may be positioned between the sensor electrode G1a and the substrate 50 such that the stabilizing electrode G0a is electrically insulated from the sensor electrode G1a. The stabilizing electrode G0b may be positioned between the sensor electrode G1b and the substrate 50 such that the stabilizing electrode G0b is electrically insulated from the sensor electrode G1b. The voltage difference between the stabilizing electrodes G0a, G0b may be kept constant e.g. by connecting the stabilizing electrodes G0a, G0b to a common node N0 (FIG. 5b). The node N0 may have a voltage $V_0$. In particular, the stabilizing electrodes G0a, G0b may be connected to an electrical ground.

The first stabilizing electrode G0a may be kept at a first fixed potential in order to de-couple the first sensor electrode G0a from the substrate, and the second stabilizing electrode G0b may be kept at a second fixed potential in order to de-couple the second sensor electrode G0b from the substrate.

The stabilizing electrodes G0a, G0b may be portions of the same conductive layer, or the stabilizing electrodes G0a, G0b may be separate electrodes. The stabilizing electrode G0a may be connected to the stabilizing electrode G0b by the conductor CON0a and/or CON0b. The stabilizing electrodes G0a, G0b may be connected to the common node N0 by the conductors CON0a, CON0b.

The stabilizing electrodes G0a, G0b may be implemented on the substrate 50. The sensor electrode G1a may be electrically insulated from the stabilizing electrode G0a by the insulating layer 60a. The sensor electrode G1b may be electrically insulated from the stabilizing electrode G0b by the insulating layer 60b. d60 may denote the thickness of the insulating layer 60a and/or 60b. The thickness d60 may be e.g. in the range of 0.5 μm to 5 μm. In particular, the thickness d60 may be in the range of 1 μm to 3 μm.

The sensor electrodes G1a and G2a may together form a first sensor capacitor C1, which has a capacitance $C_1$. The sensor electrodes G1b and G2b may together form a second sensor capacitor C2, which has a capacitance $C_2$. The capacitances $C_1$, $C_2$ may depend on the mirror gap $d_F$.

$V_a$ denotes the voltage of the first sensor electrode G1a, and $V_b$ denotes the voltage of the second sensor electrode G1b.

The electrodes G0a and G1a may together form a first stabilizing capacitor C10, which has a capacitance $C_{10}$. The electrodes G0b and G1b may together form a second stabilizing capacitor C20, which has a capacitance $C_{20}$. The stabilizing electrode G0a may substantially prevent electrical coupling between the sensor electrode G1a and the supporting portion POR50a. The stabilizing electrode G0b may substantially prevent electrical coupling between the sensor electrode G1b and the supporting portion POR50b. Consequently, the capacitances $C_{10}$, $C_{20}$ may be substantially independent of the conductivity of the substrate 50. The capacitances $C_{10}$, $C_{20}$ may be substantially independent of the conductivity of the semi-conductive path PTH50 between the supporting portions POR50a, POR50b of the substrate 50. The capacitance $C_{10}$ and the capacitance $C_{20}$ may be substantially constant.

Figure 5C:
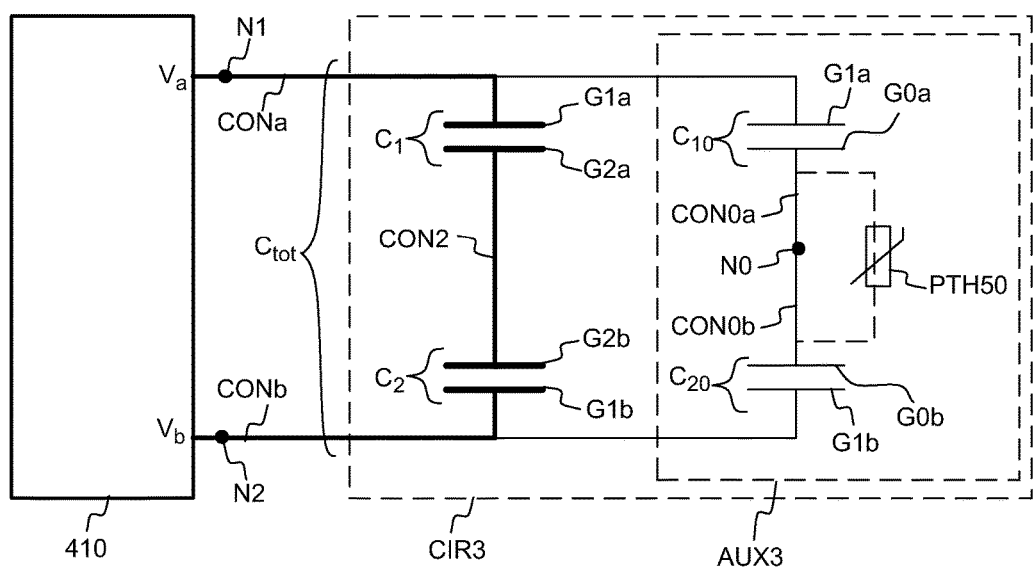

The capacitance monitoring unit 410 may be connected to the sensor electrodes G1a, G1b. FIG. 5c shows a capacitor circuit CIR3 connected to a capacitance monitoring unit 410. The circuit CIR3 represents the interferometer 300 shown in FIGS. 5a and 5b. The monitoring unit 410 may have input nodes N1, N2. The electrode G1a of the first sensor capacitor C1 may be connected to the input node N1 by the conductor CONa. The electrode G1b of the second sensor capacitor C2 may be connected to the input node N2 by the conductor CONb. The electrode G2a of the first sensor capacitor C1 may be connected to the electrode G2b of the second sensor capacitor C2.

The sensor electrode G1a and the stabilizing electrode G0a form the first stabilizing capacitor C10. The sensor electrode G1b and the stabilizing electrode G0b form the second stabilizing capacitor C20. A stabilizing capacitor circuit AUX3 may comprise the first stabilizing capacitor C10 and the second stabilizing capacitor C20 such that the stabilizing capacitors C10, C20 are connected in series. The stabilizing electrode G0a may be connected to the stabilizing electrode G0b by one or more conductors CON0a, CON0b. The stabilizing capacitor circuit AUX3 may have a capacitance $C_{AUX}$.

The stabilizing electrode G0a may be connected to the stabilizing electrode G0b by the semi-conducting path PTH50. At the same time, the stabilizing electrode G0a may also be connected to the stabilizing electrode G0b by one or more conductors CON0a, CON0b. The impedance of the one or more conductors CON0a, CON0b may be substantially lower than the impedance of the semi-conducting path PTH50 so that variations of the impedance of the semi-conducting path PTH50 do not have a significant effect on the impedance of the stabilizing capacitor circuit AUX3.

The total capacitance $C_{tot}$ of the capacitor circuit CIR3 may be approximately equal to the sum of the sensor capacitance value $C_d$ and the stabilizing capacitance value $C_{AUX}$.

$$C_{tot} = C_d + C_{AUX} \quad (6)$$

The sensor capacitor value $C_d$ may be solved e.g. from the following equation:

$$\frac{1}{C_d} = \frac{1}{C_1} + \frac{1}{C_2} \quad (7)$$

In an embodiment, the capacitance $C_1$ of the first sensor capacitor C1 may be substantially equal to the capacitance $C_2$ of the second sensor capacitor C2. In that case the sensor capacitor value $C_d$ may be substantially equal to 50% of the capacitance $C_1$, i.e. $C_d = 0.5 \cdot C_1$.

The stabilizing capacitance value $C_{AUX}$ may be solved e.g. from the following equation:

$$\frac{1}{C_{AUX}} = \frac{1}{C_{10}} + \frac{1}{C_{20}} \quad (8)$$

In an embodiment, the capacitance $C_{10}$ of the first stabilizing capacitor C10 may be substantially equal to the capacitance $C_{20}$ of the second stabilizing capacitor C20. In that case the stabilizing capacitance value $C_{AUX}$ may be substantially equal to 50% of the capacitance $C_{10}$, i.e. $C_{AUX} = 0.5 \cdot C_{10}$.

The capacitance monitoring unit 410 may be arranged to monitor the total capacitance $C_{tot}$ of the capacitor circuit CIR3. Input nodes N1, N2 of the monitoring unit 410 may be connected to the capacitor circuit CIR3. The input node N1 may be connected to the electrode G1a by the conductor CONa. The input node N2 may be connected to the electrode G1b by the conductor CONb.

Thanks to the de-coupling structures DC1, DC2, the values $C_d$ and $C_{AUX}$ may be substantially independent of the conductivity of the semi-conducing path PTH50. Consequently, the total capacitance $C_{tot}$ may also be substantially independent of the conductivity of the semi-conducing path PTH50.

The electrode G2a of the second mirror plate 200 may be galvanically connected to the electrode G2b of the second mirror plate 200 in order to shunt the varying leakage impedances between the electrodes G2a, G2b and/or to eliminate temperature-dependent cross-coupling between the electrodes G2a, G2b.

The stabilizing electrodes G0a, G0b may provide a stable equipotential surface under the sensor electrodes G1a, G1b of the first mirror plate 100.

The thickness of the d60 of the insulating layer 60a, 60b may be small when compared with the electrode gap $d_{Ga}$. Capacitive coupling between the stabilizing electrode G0a and the sensor electrode G1a may be stronger than capacitive coupling between the sensor electrodes G1a, G2a. The strong coupling may decrease the relative change of the total capacitance $C_{tot}$, but this drawback may be compensated by the better stability of the capacitance.

In an embodiment, a leakage current may be conducted from the sensor electrode G1a. However, the stabilizing electrodes G0a, G0b may stabilize the magnitude of the leakage current so that the effect of the leakage current may be accurately compensated by the capacitance monitoring unit.

In an embodiment, a first conductor CONa may be galvanically connected to the electrode G1a of the first mirror plate 100, and an additional conductor may be galvanically connected to the electrode G2a of the second mirror plate 200. A capacitance monitoring unit 410 may be arranged to monitor the first sensor capacitor C1 by using the first conductor CONa and the additional conductor. Consequently, the first sensor capacitor C1 may be monitored directly by the capacitance monitoring unit 410. A second conductor CONb may be galvanically connected to the second electrode G1b of the first mirror plate 100, and an additional conductor may be galvanically connected to the electrode G2b of the second mirror plate 200. A capacitance monitoring unit 410 may be arranged to monitor the second sensor capacitor C2 by using the second conductor CONb and the additional conductor. The same capacitance monitoring unit 410 or different capacitance monitoring units may be used for monitoring the sensor capacitors C1, C2. The same additional conductor or different additional conductors may be used for monitoring the sensor capacitors C1, C2. The additional conductor or conductors may be flexible in order to allow movement of the second mirror plate 200. The de-coupling structure DC1, DC2 may reduce or prevent capacitive coupling from the electrode G1a to the electrode G1b also when the first sensor capacitor C1 is monitored by using the additional conductor.

FIGS. 6a to 6g show method steps for producing a mirror plate, which comprises the stabilizing electrodes.

Figure 6A:
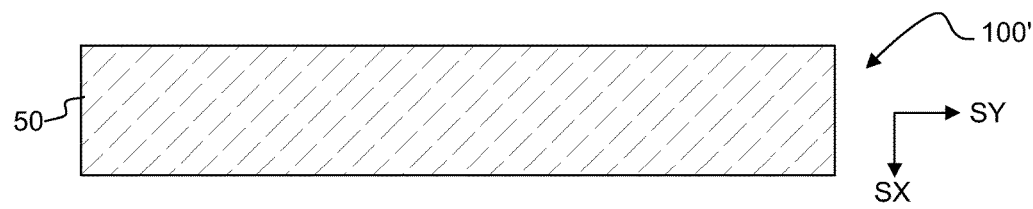
FIG. 6g shows, by way of example, method steps for producing a mirror plate, which comprises stabilizing electrodes.

Referring to FIG. 6a, a substrate 50 may be provided. The substrate 50 may consist essentially of silicon (Si). The substrate may consist of silicon. The substrate may comprise an uppermost layer, which consists essentially of silicon.

Figure 6B:
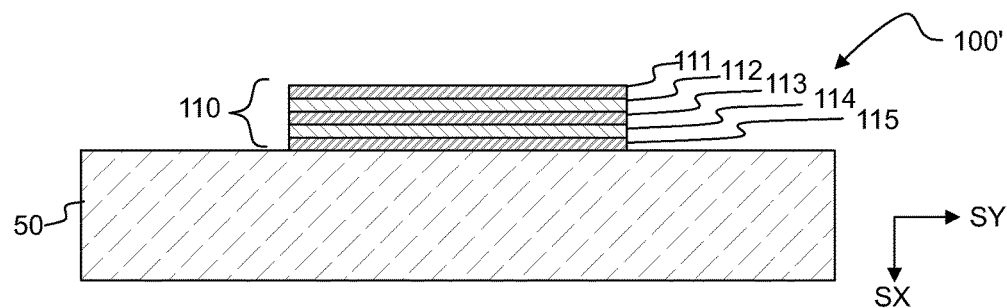

Referring to FIG. 6b, the substrate 50 may be coated with a semi-transparent reflective coating 110. The coating 110 may be a multilayer coating. The coating may be a dielectric multilayer coating. The semi-transparent reflective coating 110 may comprise a plurality of dielectric layers. The coating 110 may comprise e.g. layers 111, 112, 113, 114, 115.

Figure 6C:
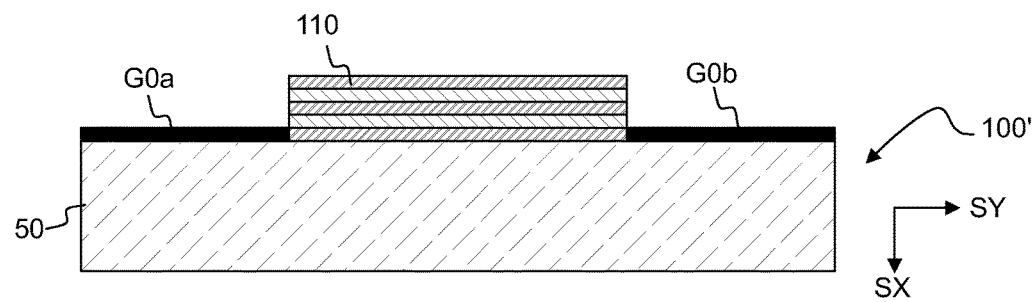

Referring to FIG. 6c, the stabilizing electrodes G0a, G0b may be deposited on the substrate 50. The stabilizing electrodes G0a, G0b may be deposited directly on the substrate 50. Alternatively or in addition, one or more intermediate layers may be deposited on the substrate 50, and the stabilizing electrodes G0a, G0b may be deposited on the one or more intermediate layers. For example, the stabilizing electrode G0a may be deposited on an intermediate layer, which consists essentially of silica ($SiO_2$).

The stabilizing electrodes may also be formed e.g. by physical vapor deposition (PVD), by chemical vapor deposition (CVD), and/or by atomic layer deposition (ALD). In particular, the electrodes may be formed by sputtering. The stabilizing electrodes may also be formed e.g. by doping the substrate 50. The substrate may be doped e.g. by ion implantation and/or by diffusion.

The material of the electrodes may be e.g. gold, silver, copper, aluminum, or polysilicon. The electrical conductivity of the material of the stabilizing electrodes may be substantially higher than the electrical conductivity of the silicon of the substrate 50.

Figure 6D:
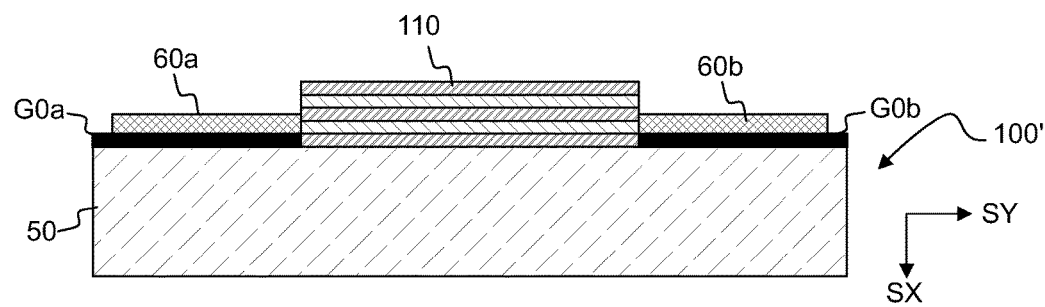

Referring to FIG. 6d, insulating layers 60a, 60b may be formed on the stabilizing electrodes G0a, G0b. The material of the insulating layer 60a, 60b may be e.g. silicon dioxide (silica, $SiO_2$), aluminium oxide ($Al_2O_3$), or a polymer. Silicon dioxide may provide high mechanical stability. Increasing the thickness of the insulating layer 60a, 60b may reduce disturbing capacitive coupling and/or leakage current. In case of silicon dioxide, the thickness of the layer 60a, 60b may be e.g. greater than 1 μm, preferably greater than or equal to 2 μm. The thickness d60 may be e.g. in the range of 0.5 μm to 5 μm. In particular, the thickness d60 may be in the range of 1 μm to 3 μm.

Figure 6E:
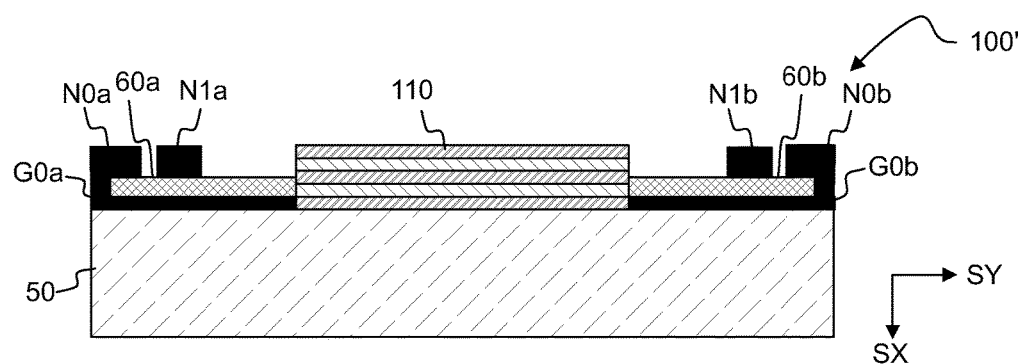

Referring to FIG. 6e, terminal pads N0a, N0b may be optionally formed on the electrodes G0a, G0b. One or more conductors CON0a, CON0b may be subsequently connected to the terminals N0a, N0b. The terminals N0a, N0b may be omitted e.g. when the electrodes G0a, G0b are portions of the same conductive layer. The terminal N0a may be arranged to operate as a connection node, and the terminal N0b may be arranged to operate as a connection node. The terminals N0a, N0b may be connected to each other in order to keep the electrodes G0a, G0b at the same voltage V0.

Figure 6F:
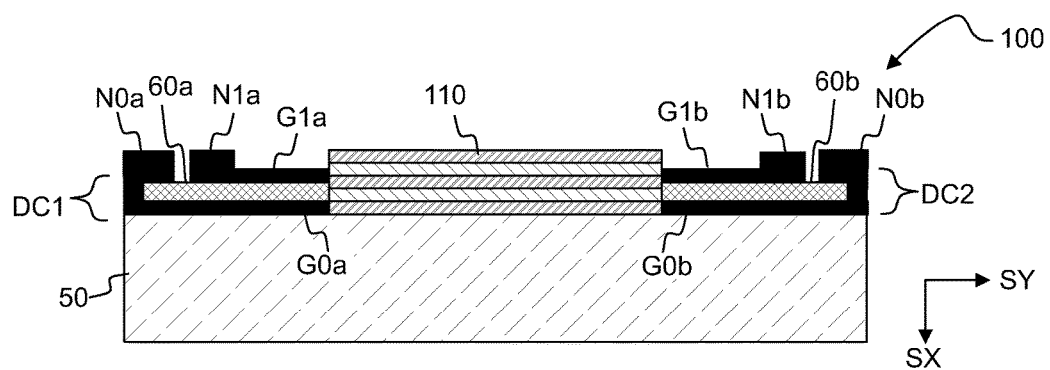

Referring to FIG. 6f, the sensor electrode G1a may be formed on the insulating layer 60a. The sensor electrode G1b may be formed on the insulating layer 60a. The sensor electrode G1b may be formed on the insulating layer 60b.

The material of the sensor electrode G1a, G1b may be e.g. metal, polysilicon or other semiconducting material. The material of the electrodes G1a, G1b may be e.g. gold, silver, copper, aluminum, or polysilicon.

The first stabilizing capacitor C10 may comprise the stabilizing electrode G0a, the insulating layer 60a, and the sensor electrode G1a. The second stabilizing capacitor C20 may comprise the stabilizing electrode G0b, the insulating layer 60b, and the sensor electrode G1b.

Figure 6G:
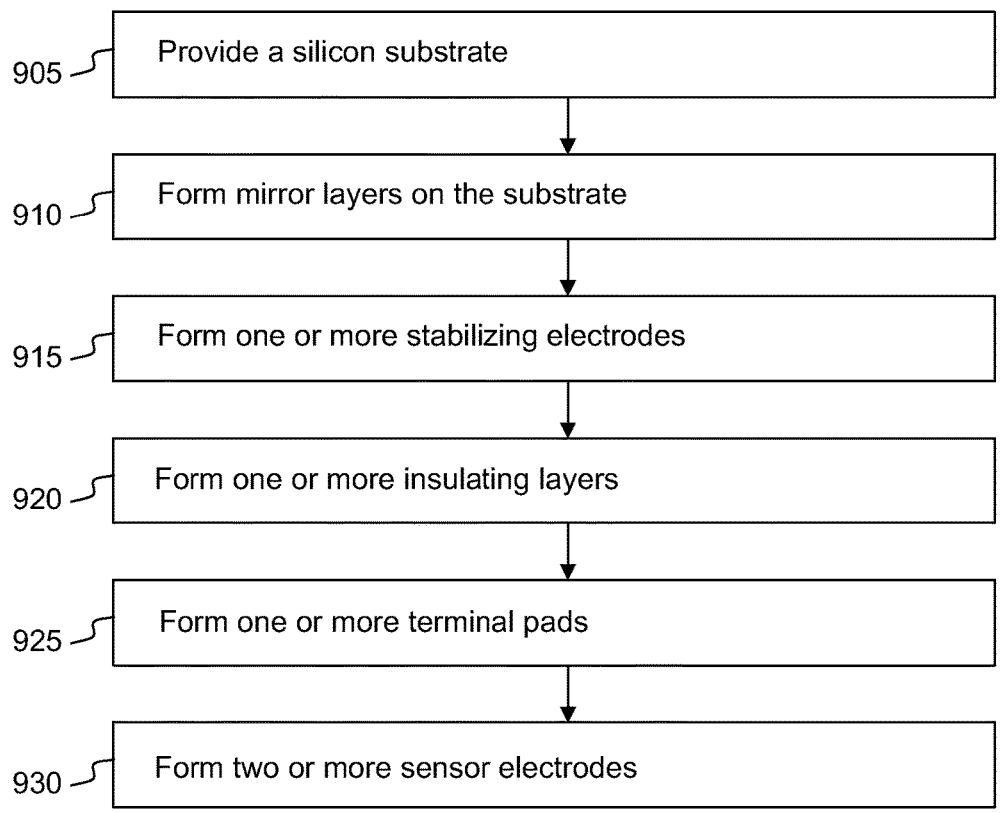

FIG. 6g shows method steps for forming the stabilizing capacitors C10, C20.

In step 905, the silicon substrate 50 may be provided.

In step 910, the reflective coating 110 may be formed on the substrate 50.

In step 915, the stabilizing electrodes G0a, G0b may be formed on the substrate 50.

In step 920, the insulating layer 60a may be formed on the stabilizing electrode G0a, and the insulating layer 60b may be formed on the stabilizing electrode G0b.

In step 925, the terminal pads N0a, N0b may be optionally formed.

In step 930, the sensor electrode G1a may be formed on the insulating layer 60a. The sensor electrode G1b may be formed on the insulating layer 60b.

In an optional further step, a Fabry-Perot interferometer 300 comprising the mirror plate 100 and a second mirror plate 200 may be assembled.

In an optional calibration step, a capacitance value $C_d$ and/or a sensor signal value $S_d$ indicative of the capacitance value $C_d$ may be experimentally measured for at least one known mirror gap value $d_F$. The mirror gap value $d_F$ may be measured e.g. optically (see FIGS. 8a and 8b).

Figure 9:
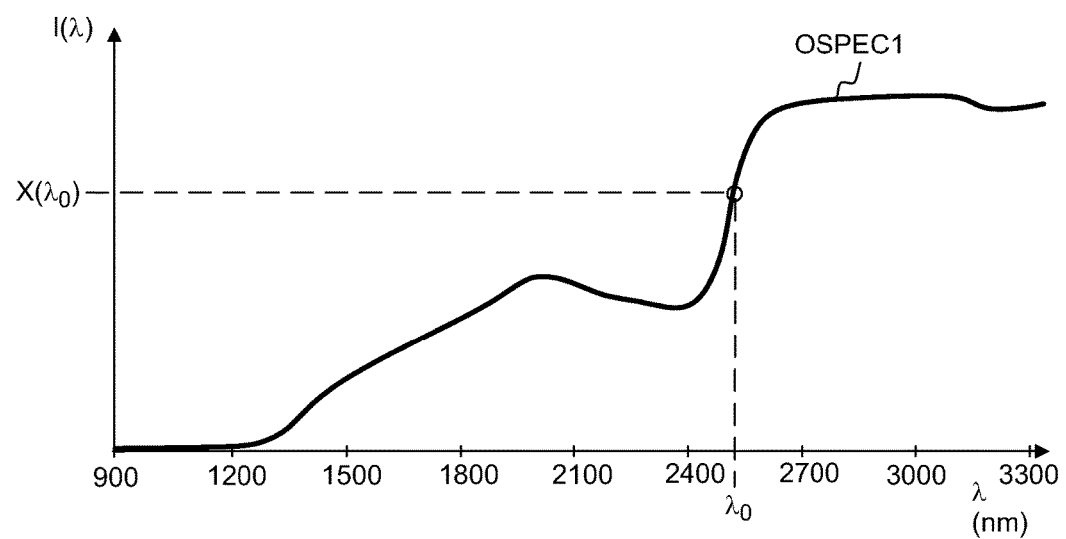
FIG. 9 shows, by way of example, measuring the spectrum of an object.

In an optional further step, a spectrometer 700 comprising the mirror plate 100 may be used for monitoring a (unknown) spectrum OSPEC1 of an object OBJ1 (See FIG. 9).

Figure 7A:
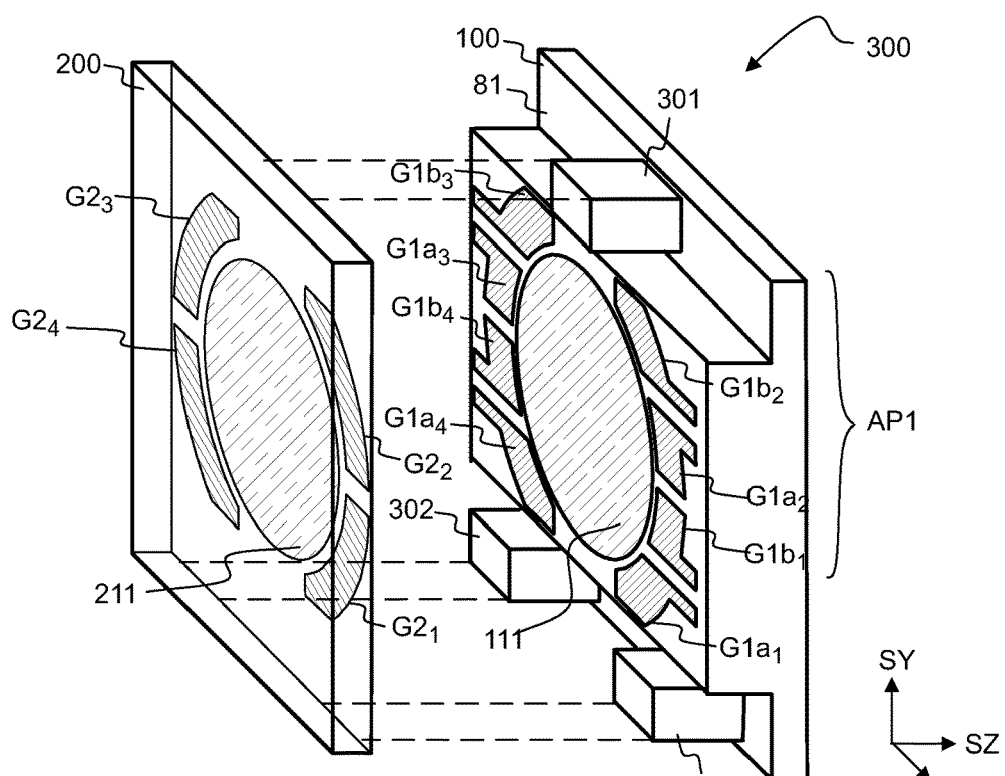
FIG. 7a shows, by way of example, in a three-dimensional exploded view, a first mirror plate and a second mirror plate of a Fabry-Perot interferometer.

FIG. 7a shows, by way of example, in a three-dimensional exploded view of a Fabry-Perot interferometer 300. The interferometer 300 may comprise a first mirror plate 100, a second mirror plate 200, and one or more actuators 301, 302, 303.

The first mirror plate 100 may have electrodes $G1a_1$, $G1b_1$, $G1a_2$, $G1b_2$, $G1a_2$, $G1b_2$, $G1a_2$, $G1b_2$. The second mirror plate 200 may have electrodes $G2_1$, $G2_2$, $G2_3$, $G2_4$. The electrodes $G1a_1$, $G1b_1$, $G1a_2$, $G1b_2$, $G1a_2$, $G1b_2$, $G1a_2$, $G1b_2$ may be implemented on top of one or more de-coupling structures DC1, DC2 in order to prevent mutual electrical coupling via the substrate 50 of the first plate 100. The electrode $G1a_1$ may be implemented on top of a first de-coupling structure DC1, and/or the electrode $G1b_1$ may be implemented on top of a second de-coupling structure DC2 in order to prevent mutual electrical coupling via the substrate 50 of the first plate 100.

The electrodes $G1a_1$, $G1b_1$, $G1a_2$, $G1b_2$, $G1a_2$, $G1b_2$, $G1a_2$, $G1b_2$, $G2_1$, $G2_2$, $G2_3$, $G2_4$ may be galvanically separate from each other. The electrode $G2_1$ may have electrode portions $G2a_1$, $G2b_1$. The electrode $G1a_1$ and the electrode portion $G2a_1$ may form a first sensor capacitor C1. The electrode $G1b_1$ and the electrode portion $G2b_1$ may form a second sensor capacitor C2. The sensor capacitors C1 and C2 are connected in series, and may together form a first sensor capacitor system, which has a capacitance $C_d$. The electrode electrode $G1a_1$ may have a terminal $N1_1$, and the electrode $G1b_1$ may have a terminal terminal $N2_1$. The capacitance $C_d$ may be monitored by using a monitoring unit 410, which is connected to the terminals $N1_1$, $N2_1$.

The second mirror plate 200 may comprise a reflective coating 210, which may have an outer layer 211. The second mirror plate 200 may have one or more electrodes $G2_1$, $G2_2$, $G2_3$, $G2_4$. The electrodes $G2_1$, $G2_2$, $G2_3$, $G2_4$ may be called e.g. as counter electrodes. The dimensions and the position of the electrode $G2_1$ may be selected such that the electrodes $G1a_1$ and $G1b_1$ at least partially overlap the counter-electrode $G2_1$ the interferometer 300 has been assembled.

The mirror plate 100 may optionally comprise a recessed portion 81 for providing space for an actuator 301, 302, 303.

Figure 7B:
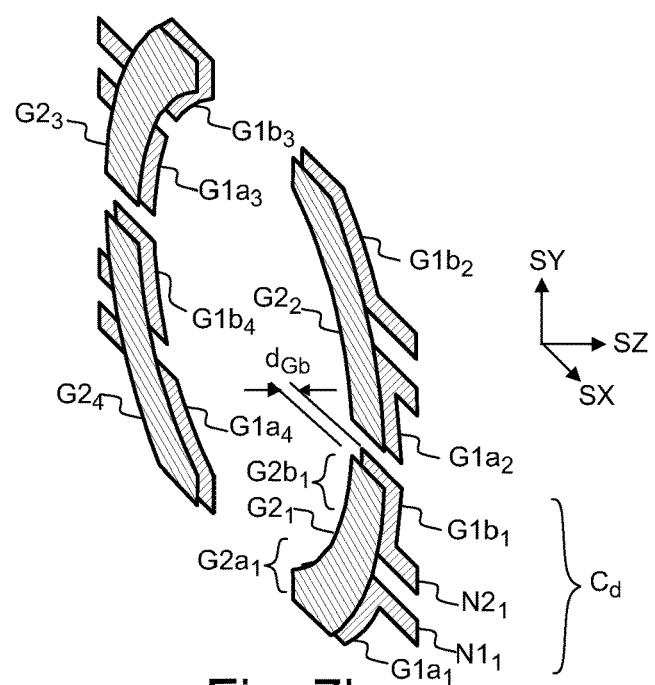
FIG. 7b shows, by way of example, in a three-dimensional view, the positions of the sensor electrodes of the Fabry-Perot interferometer of FIG. 7a, FIG. 8a shows, by way of example, a set-up for calibrating the mirror gap.

FIG. 7b shows, in a three-dimensional view, the positions of the counter electrodes $G2_1$, $G2_2$, $G2_3$, $G2_4$ with respect to the electrodes $G1a_1$, $G1b_1$, $G1a_2$, $G1b_2$, $G1a_2$, $G1b_2$, $G1a_2$, $G1b_2$.

The electrodes $G1a_1$, $G2_1$, and $G1b_1$ may be arranged to form a first sensor capacitor system, which has a capacitance $C_d$, which is indicative of the mirror gap $d_F$ at a first predetermined position of the aperture portion AP1. The monitoring unit 410 may be connected to the electrodes $G1a_1$ and $G1b_1$ by conductors CONa, CONb. The mirror plate 100 may be stationary. In an embodiment, it is not necessary to bond flexible conductors to the moving second mirror plate 200. The conductors CONa, CONb may be attached to the mirror plate 100, which may be immovable with respect to the capacitance monitoring unit 410.

The electrodes $G1a_2$, $G2_2$, and $G1b_2$ may form a second sensor capacitor system. The electrodes $G1a_3$, $G2_3$, and $G1b_3$ may form a third sensor capacitor system. The electrodes $G1a_4$, $G2_4$, and $G1b_4$ may form a fourth sensor capacitor system. Each sensor capacitor system may have terminal portions for connecting to a capacitance monitoring unit.

The sensor electrodes may be arranged to monitor the alignment of the second mirror plate 200 with respect to the first mirror plate 100. The Fabry-Perot interferometer may be operated such that the reflective coating 110 of the second plate 100 is substantially parallel to the reflective coating 210 of the first plate 200. The mutual parallelism of the plates 100, 200 may be monitored by comparing the capacitance of the second sensor capacitor system with the capacitance of the first sensor capacitance system. For example, a non-zero difference between the capacitance of the first sensor capacitor system and the capacitance of the second sensor capacitor system may indicate that the second plate 200 is tilted about the axis SX. For example, a non-zero difference between the capacitance of the second sensor capacitor system and the capacitance of the third sensor capacitor system may indicate that the second plate 200 is tilted about the axis SY.

The control unit CNT1 may be arranged to drive the actuators 301, 302, 303 such that the reflective coating 210 of the plate 200 may be kept substantially parallel to the reflective coating 110 of the plate 100. The control unit CNT1 may be arranged to drive the actuators 301, 302, 303 such that the reflective coating of the plate 200 may be kept substantially parallel to the reflective coating of the plate 100 during varying the mirror gap $d_F$.

In an embodiment, the interferometer 300 may comprise three sensor capacitor systems for monitoring a tilt angle of the plate 200 about the axis SX, for monitoring a tilt angle of the plate 200 about the axis SY, and for monitoring the spatially averaged value of the mirror gap $d_F$. A first tilt angle about the axis SX may be monitored e.g. by comparing the capacitance value of a first sensor capacitor system with the capacitance value of a second sensor capacitor system. A second tilt angle about the axis SY may be monitored e.g. by comparing the capacitance value of the second sensor capacitor system with the capacitance value of a third sensor capacitor system. The first sensor capacitor system may be formed e.g. by the electrodes $G1a_1$, $G2_1$, and $G1b_1$. The second sensor capacitor system may be formed e.g. by the electrodes $G1a_2$, $G2_2$, and $G1b_2$. The third sensor capacitor system may be formed e.g. by the electrodes $G1a_3$, $G2_3$, and $G1b_3$.

In an embodiment, also the electrodes $G2_1$, $G2_2$, $G2_3$, $G2_4$ may be implemented on top of de-coupling structures in order to prevent mutual electrical coupling via the substrate of the second plate 200. However, the second plate 200 does not need to comprise de-coupling structures e.g. in a situation where the sensor capacitors are not monitored simultaneously.

Figure 8A:
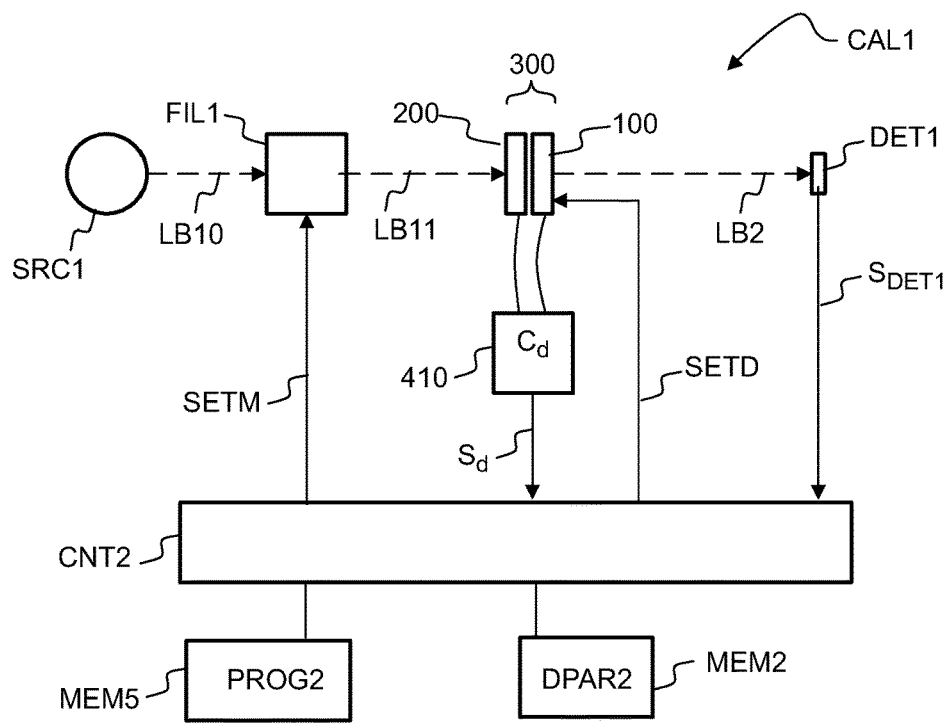
FIG. 8b shows, by way of example, spectral positions of the transmission peaks of the interferometer.

FIG. 8a shows a calibration system CAL1 for measuring a value of the sensor capacitance $C_d$ associated with a mirror gap $d_F$. The calibration system CAL1 may be arranged to provide sensor capacitance values $C_d$ associated with each relevant mirror gap $d_F$. The calibration system CAL1 may provide a sensor signal value $S_d$ associated with a mirror gap $d_F$. The calibration system CAL1 may provide sensor signal values $S_d$ associated with each relevant mirror gap $d_F$.

The calibration system CAL1 may be arranged to provide narrowband calibration light LB11. The calibration light LB11 may be substantially monochromatic. The calibration light LB11 has a wavelength $\lambda_M$. The wavelength $\lambda_M$ may be fixed or adjustable. The calibration light LB11 may be provided e.g. by filtering light LB10 of a broadband light source SRC1 with a monochromator FIL1. The interferometer 300 may provide transmitted light LB2 by filtering the calibration light LB11. An optical detector DET1 may be arranged to monitor the intensity of light LB2 transmitted through the Fabry-Perot interferometer 300. The detector DET1 may provide a detector signal $S_{DET1}$ indicative of the transmitted intensity.

The capacitance monitoring unit 410 may be arranged to provide a sensor signal $S_d$, which is indicative of the value of a sensor capacitance $C_d$. The system CAL1 may comprise a control unit CNT2, which may be arranged to change the wavelength $\lambda_M$ of the calibration light LB11 and/or the mirror gap $d_F$, and to monitor the detector signal $S_{DET1}$ as a function of the parameters $\lambda_M$ and $S_d$.

The calibration system CAL1 may comprise a memory MEM5 for storing computer program code PROG2, which when executed by one or more data processors may cause the system CAL1 to perform mirror gap calibration.

The relationship between each value of the sensor signal $S_d$ and the corresponding mirror gap $d_F$ may be stored in a memory MEM2 as one or more spectral calibration parameters DPAR2. The spectral calibration parameters DPAR2 may comprise e.g. a table, which contains a list of sensor signal values $S_d$ associated with respective mirror gap values $d_F$. The spectral calibration parameters DPAR2 may comprise e.g. a regression function, which may allow calculation of an estimate of the actual value of the mirror gap $d_F$ as a function of the sensor signal $S_d$. An estimate of the actual value of the mirror gap $d_F$ may be determined from the sensor signal $S_d$ by using said regression function. The spectral calibration parameters DPAR2 may comprise e.g. a regression function, which may allow calculation of the spectral position $\lambda_0$ of the transmittance peak PEAK1 as a function of the sensor signal $S_d$.

Figure 8B:
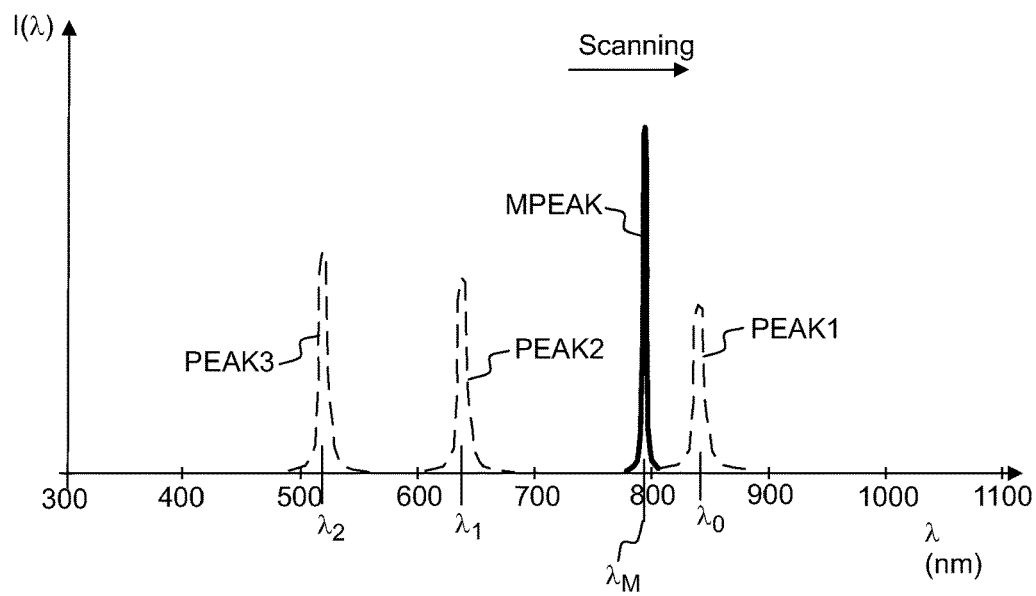

Referring to FIG. 8b, the spectral positions $\lambda_0$ of the transmission peaks PEAK1, PEAK2, PEAK3 of the interferometer may depend on the mirror gap $d_F$. The control unit CNT2 of the system CAL1 may adjust the monochromator FIL1 such that the narrowband calibration light LB11 has a desired (known) wavelength $\lambda_M$. The marking MPEAK denotes the spectral peak of the calibration light LB11. The control unit CNT2 may change the spectral position $\lambda_0$ of the transmission peak PEAK1 by changing the mirror gap $d_F$. The calibration may comprise varying the mirror gap $d_F$ and/or varying the wavelength $\lambda_M$. For example, the mirror gap $d_F$ may be varied while keeping the wavelength $\lambda_M$ constant. For example, the wavelength $\lambda_M$ may be varied while the mirror gap $d_F$ is kept constant. For example, the wavelength $\lambda_M$ and the mirror gap $d_F$ may be varied.

The intensity transmitted through the interferometer 300 may reach a maximum when the spectral position $\lambda_0$ of the transmission peak PEAK1 substantially coincides with wavelength $\lambda_M$ of the narrowband calibration light LB11. The control unit CNT2 may be arranged to scan the mirror gap $d_F$, and to determine a sensor signal value $S_d$ associated with the known wavelength $\lambda_M$ when $\lambda_0=\lambda_M$, by monitoring when the transmitted intensity reaches a maximum.

The method may comprise varying the mirror gap $d_F$ and recording a capacitance value $C_d$ and/or a sensor signal value $S_d$, which is associated with maximum transmitted intensity. When the transmitted intensity reaches a (local) maximum, a mirror gap value $d_F$ can be determined from the wavelength $\lambda_M$ by using the Fabry-Perot transmission function and by using knowledge about the order of interference. The determined mirror gap value $d_F$ may be associated with the recorded capacitance value $C_d$. The determined mirror gap value $d_F$ may be associated with the recorded sensor signal value $S_d$. The wavelength $\lambda_M$ may be associated with the recorded capacitance value $C_d$. The wavelength $\lambda_M$ may be associated with the recorded sensor signal value $S_d$.

An associated pair of values $(C_d,d_F)$ may be used for providing a regression function, which allows determining the mirror gap as a function of the capacitance of the sensor capacitor. The associated pair of values $(S_d,d_F)$ may be used for providing a regression function, which allows determining the mirror gap as a function of the sensor signal. The associated pair of values $(C_d,\lambda_M)$ may be used for providing a regression function, which allows determining the wavelength of transmission peak as a function of the capacitance of the sensor capacitor. The associated pair of values $(S_d,\lambda_M)$ may be used for providing a regression function, which allows determining the wavelength of transmission peak as a function of the sensor signal. Several pairs of values $(C_d,d_F)$ may be measured. The regression function may be determined based on several pairs of values $(C_d,d_F)$. Spectral calibration data DPAR2 may comprise one or more parameters, which define the regression function.

The control unit CNT2 may be configured to scan the wavelength $\lambda_M$, when the mirror gap $d_F$ is kept constant. The control unit CNT2 may be configured to determine a sensor signal value $S_d$ associated with the known wavelength $\lambda_M$ when $\lambda_M = \lambda_M$, e.g. by monitoring when the transmitted intensity reaches a maximum.

The method may comprise:
- assembling a Fabry-Perot interferometer 300, which comprises the a first mirror plate 100 and a second mirror plate 200, wherein the mirror plates comprise electrodes, which form a sensor capacitor whose capacitance $C_d$ depends on the mirror gap $d_F$,
- coupling narrowband light LB11 through the Fabry-Perot interferometer 300 to a detector DET1,
- varying the wavelength $\lambda_M$ of the narrowband light LB11 and/or varying the mirror gap $d_F$, and
- monitoring the intensity of light transmitted through the Fabry-Perot interferometer 300.

The narrowband calibration light LB11 may also be e.g. a laser beam. The calibration light LB11 may be provided e.g. by a laser.

FIG. 9 shows, by way of example, the spectral intensity $I(\lambda)$ of light LB1 received from an object OBJ1. In particular, the curve OSPEC1 may represent the spectral intensity $I(\lambda)$ of light LB1 received from a certain point of the object OBJ1. The spectral intensity $I(\lambda)$ may have a value $X(\lambda_0)$ at a wavelength $\lambda_0$. The value $X(\lambda_0)$ may be determined from the detector signal $S_R$ obtained from the optical detector 600. The wavelength $\lambda_0$ may be selected by adjusting the mirror gap $d_F$ before the detector signal $S_R$ is obtained from the optical detector 600. The mirror gap $d_F$ may be scanned during a measurement in order to measure spectral range of the spectrum OSPEC1 of the object OBJ1. The mirror gap $d_F$ may be scanned during a measurement in order to measure a wider spectrum of the object OBJ1.

The object OBJ1 may be e.g. a real object or a virtual object. A real object OBJ1 may be e.g. in solid, liquid, or gaseous form. The real object OBJ1 may be a cuvette filled with a gas. The real object OBJ1 may be e.g. a plant (e.g. tree or a flower), a combustion flame, or an oil spill floating on water. The real object OBJ1 may be e.g. the sun or a star observed through a layer of absorbing gas. The real object may be e.g. an image printed on a paper. A virtual object OBJ1 may be e.g. an optical image formed by another optical device.

The interferometer 300 may be suitable for filtering and/or analyzing infrared light. The materials and the dimensions of the mirror plate 100 may be selected such that a Fabry Perot interferometer 300 comprising the mirror plate 100 may be applicable for spectral analysis of infrared light.

The Fabry-Perot interferometer may be used as an optical filter, which has a variable mirror gap. An optical device may comprise one or more Fabry-Perot interferometers. The optical device may be e.g. a non-imaging spectrometer, an imaging spectrometer, a chemical analyzer, a biomedical sensor, and/or a component of a telecommunication system. The Fabry-Perot interferometer may comprise one or more actuators 301 for adjusting the mirror gap $d_F$.

For example, a spectrometer 700 comprising the mirror plate 100 may be arranged to measure the concentration of a gas by monitoring optical absorption in the infrared region. For example, a spectrometer 700 comprising the mirror plate 100 may be arranged to determine spectral data from human tissue or from animal tissue, e.g. in order to detect cancer or another abnormal condition.

The term "plate" may refer to a body, which has one or more substantially planar portions. The plate may have a first substantially planar portion so as to minimize wavefront distortion of light transmitted and/or reflected by said planar portion. The plate may optionally have a second substantially planar portion, so as to minimize wavefront distortion of light transmitted through the first substantially planar portion and the second substantially planar portion. The first planar portion may cover the entire top surface of the plate, or the first planar portion may cover less than 100% of the top surface of the plate. The second planar portion may cover the entire bottom surface of the plate, or the second planar portion may cover less than 100% of the bottom surface of the plate. The plate may optionally have e.g. one or more protruding portions and/or recessed portions (see e.g. the recessed portion 81 in FIG. 7a). In an embodiment, first planar portion may be substantially parallel to the second planar portion. In an embodiment, first planar portion and the second planar portion may define a non-zero wedge angle e.g. in order to reduce unwanted reflections.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. A mirror plate for a Fabry-Perot interferometer, the mirror plate comprising:
   - a substrate, which comprises silicon (Si),
   - a semi-transparent reflective coating implemented on the substrate,
   - a de-coupling structure formed on the substrate,
   - a first sensor electrode formed on top of the de-coupling structure, and
   - a second sensor electrode, herein the de-coupling structure comprises an electrically insulating layer, wherein the de-coupling structure further comprises a first stabilizing electrode, which is located between the first sensor electrode and the substrate.

2. The mirror plate of claim 1, further comprising a second de-coupling structure, wherein the second de-coupling structure comprises an electrically insulating layer, and a second stabilizing electrode, which is located between the second sensor electrode and the substrate.

3. The mirror plate of claim 1 wherein the dimensions of the first stabilizing electrode have been selected such that the thermally induced change ($\Delta X_{PAR}$) of reactance ($X_{PAR}$) between the first sensor electrode and the second sensor electrode is smaller than 0.1% of a reference value $X_{REF}$ when the temperature of the substrate is changed by 1° C., wherein the reactance ($X_{PAR}$) is determined at the frequency of 10 kHz, and the reference value $X_{REF}$ is calculated according to the following equation:

$$X_{REF} = \frac{1}{2\pi \cdot 10 \text{ kHz} \cdot \left(\frac{\varepsilon \cdot A}{50 \text{ µm}}\right)}$$

where ε denotes the dielectric permittivity of vacuum, and A denotes the area of the first sensor electrode (G1a).

4. A method for producing a mirror plate for a Fabry-Perot interferometer, the method comprising:
   providing a substrate, which comprises silicon,
   implementing a semi-transparent reflective coating on the substrate,
   forming a de-coupling structure on the substrate,
   forming a first sensor electrode on top of the de-coupling structure, and
   forming a second sensor electrode supported by the substrate,
herein the de-coupling structure comprises an electrically insulating layer, wherein the de-coupling structure further comprises a first stabilizing electrode, which is located between the first sensor electrode and the substrate.

5. The method of claim 4 comprising:
   forming the first stabilizing electrode on the substrate,
   forming a layer of silica (SiO$_2$) on the first stabilizing electrode, and
   forming the first sensor electrode on top of the layer of silica (SiO$_2$).

6. The method of claim 4 wherein the dimensions of the first stabilizing electrode have seen selected such that the thermally induced change ($\Delta X_{PAR}$) of reactance ($X_{PAR}$) between the first sensor electrode and the second sensor electrode is smaller than 0.1% of a reference value $X_{REF}$ when the temperature of the substrate is changed by 1° C., wherein the reactance ($X_{PAR}$) is determined at the frequency of 10 kHz, and the reference value $X_{REF}$ is calculated according to the following equation:

$$X_{REF} = \frac{1}{2\pi \cdot 10 \text{ kHz} \cdot \left(\frac{\varepsilon \cdot A}{50 \text{ µm}}\right)}$$

where ε denotes the dielectric permittivity of vacuum, and A denotes the area of the first sensor electrode.

7. A Fabry-Perot interferometer, which comprises a first mirror plate (100) and a second mirror plate, the first mirror plate comprising:
   a substrate, which comprises silicon,
   a semi-transparent reflective coating implemented on the substrate,
   a de-coupling structure formed on or in the substrate,
   a first sensor electrode formed on top of the de-coupling structure, and
   a second sensor electrode,
he second mirror plate comprising a third sensor electrode and a fourth sensor electrode such that the first sensor electrode (G1a) and the third sensor electrode form a first sensor capacitor, the second sensor electrode and the fourth sensor electrode form a second sensor capacitor, the capacitance of the first sensor capacitor is indicative of the mirror gap of the Fabry-Perot interferometer,
   wherein the de-coupling structure comprises an electrically insulating layer, wherein the de-coupling structure further comprises a first stabilizing electrode, which is located between the first sensor electrode and the substrate.

8. The interferometer of claim 7 wherein the first mirror plate comprises a second stabilizing electrode, which is located between the second sensor electrode band the substrate.

9. The interferometer of claim 8 wherein the second stabilizing electrode is galvanically connected to the first stabilizing electrode.

10. The interferometer of claim 8 wherein the first mirror plate comprises said second stabilizing electrode, which is located between the second sensor electrode and the substrate, and wherein the first stabilizing electrode and the second stabilizing electrode are portions of the same conductive layer.

11. The interferometer of claim 7 wherein a thermally induced change of capacitance ($C_{PAR}$) between the first sensor electrode and the second sensor electrode is smaller than 0.1% of the capacitance of the first sensor capacitor when the temperature of the substrate is changed by 1° C.

12. The interferometer of claim 7 comprising a capacitance monitoring unit, which is connected to the first sensor electrode and to the second sensor electrode.

13. The interferometer of claim 7 comprising a plurality of sensor electrodes, which are arranged to monitor the alignment of the second mirror plate with respect to the first mirror plate.

\* \* \* \* \*